United States Patent [19]

Siegling, III et al.

[11] Patent Number: 5,740,025
[45] Date of Patent: Apr. 14, 1998

[54] ELECTRONIC CONTROLLER FOR A TROLLEY POLE SWITCH MECHANISM

[75] Inventors: Charles C. Siegling, III, Greenville, S.C.; Francis A. Launier, Laval, Canada; John H. Corvin, Greer, S.C.

[73] Assignee: Westinghouse Air Brake Company, Wilmerding, Pa.

[21] Appl. No.: 644,402

[22] Filed: May 1, 1996

[51] Int. Cl.$^6$ .................................................. H02M 7/00
[52] U.S. Cl. .......................... 363/65; 246/419; 246/468; 191/37; 191/38
[58] Field of Search .......................... 246/418, 419, 246/468, 460, 472, 476, 462; 104/130.01; 191/38, 33 R, 37; 455/68; 363/65; 307/75

[56] References Cited

U.S. PATENT DOCUMENTS

| | | | |
|---|---|---|---|
| 2,360,064 | 10/1944 | Lewis | 191/38 |
| 2,710,316 | 3/1955 | George | 191/38 |
| 4,090,452 | 5/1978 | Segar | 104/247 |
| 5,297,661 | 3/1994 | Tschurbanoff | 191/38 |
| 5,390,772 | 2/1995 | Ta et al. | 191/38 |

*Primary Examiner*—Peter S. Wong
*Assistant Examiner*—Shawn Riley

*Attorney, Agent, or Firm*—James Ray & Associates

[57] ABSTRACT

An electronic controller for controlling a trolley pole switch is disclosed. The trolley pole switch switches the path of travel that an energy collector of a trolley pole takes through the trolley pole switch at a junction of power conduits diverging from the trolley pole switch. The electronic trolley pole switch controller includes a signal processing device and a power controlling device employed in tandem to control the frog solenoids of a trolley pole switch. The signal processing device detects and processes a plurality of modulated signals. Each modulated signal represents a request to switch the path of travel that the energy collector takes through the trolley pole switch to a desired one of the power conduits diverging therefrom. In response to each modulated signal, the signal processing device generates an intermediate command signal indicative of a command to supply power to the appropriate frog solenoid that effects the switch in the path of travel through the trolley pole switch to the desired power conduit. The power controlling device receives the intermediate command signal from the signal processing device and in response thereto supplies power to that frog solenoid. The frog solenoid energizes and therethrough compels the trolley pole switch to switch the path of travel that the energy collector will take through the trolley pole switch to the desired power conduit.

22 Claims, 16 Drawing Sheets

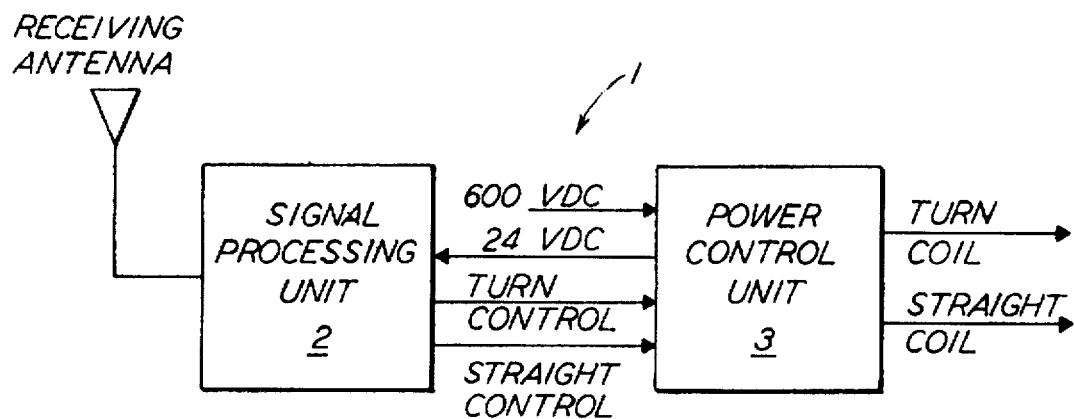
FIG. IA
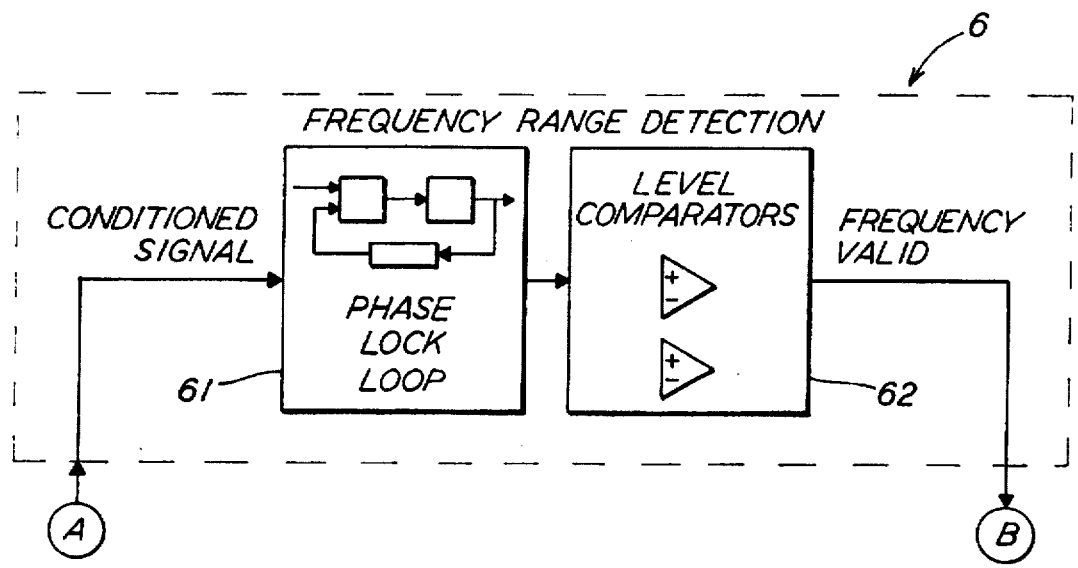
FIG. IC

ELECTRONIC CONTROLLER FOR A TROLLEY POLE SWITCH MECHANISM

CROSS-REFERENCE TO RELATED APPLICATIONS

This application is related to copending applications Ser. Nos. 08/641,439 and 08/644,406, entitled Signal Processing Unit For A Trolley Pole Switch Controller and Power Controlling Unit For A Trolley Pole Switch Controller, respectively, both sharing the same filing date of the present application, May 1, 1996, and filed currently herewith. These patent applications are assigned to the assignee of the present invention, and the teachings therein are incorporated into the present application by reference thereto.

FIELD OF THE INVENTION

The present invention generally relates to a trolley pole switch for switching the path of travel of an energy collector assembly of a trolley pole at a junction of diverging power conduits. More particularly, the present invention is concerned with an electronic controller for a trolley pole switch including a signal processing unit and a power controlling unit employed in tandem to control the frog solenoids of a trolley pole switch.

BACKGROUND OF THE INVENTION

As is well known in the trolley vehicle art, an electrically powered trolley vehicle receives the energy needed for its operation from an overhead catenary or a similar power conduit. Mounted atop the trolley vehicle is a trolley pole to which is attached at one end an energy collector assembly. The energy collector assembly rides along the power conduit, or "trolley line" as it is often called, as the trolley vehicle travels along its route of travel. The energy is conveyed from the power conduit through the energy collector assembly of the trolley pole and ultimately delivered to a propulsion unit and other energy consuming devices located on the trolley vehicle.

Also well known in the trolley vehicle art is the operation of a trolley pole switch mechanism (hereinafter "trolley pole switch"). A trolley pole switch is a device situated at a junction of diverging power conduits located above the point where the routes of travel of the trolley vehicle diverge in different directions. The trolley pole switch is used to switch the path of travel that the energy collector assembly of the trolley pole takes at a junction of diverging power conduits. A junction of diverging power conduits may consist of one power conduit strung in a straight path and another power conduit diverging therefrom strung in a path heading to a generally left direction. Likewise, such a junction may consist of one power conduit strung in a straight path and another diverging therefrom strung in a path heading to a generally right direction.

As a trolley vehicle approaches a junction, the trolley pole switch may be commanded to switch the path that the energy collector assembly will travel from the power conduit strung in a straight path to either of the power conduits strung in the left or right direction. When the trolley vehicle seeks to proceed through a junction in a straight path, the trolley pole switch, as explained below, may or may not have to be commanded to switch the path to assure that the energy collector proceeds therethrough on the power conduit strung in the straight path. The route of travel of the trolley vehicle, of course, always corresponds to the path of travel that the energy collector assembly follows through trolley pole switch and thereafter on the power conduit to which it is directed.

The typical trolley pole switch has two switching elements, or "frogs" as they are often called. A frog of the type that is controllable by the instant invention is described in U.S. Pat. No. 5,390,772 to Ta et al., incorporated herein by reference. Each frog, as described in Ta et al., of the typical trolley pole switch, contains an electrical operator such as a solenoid. When the solenoid of one frog is energized, it acts upon certain elements within that frog to switch the path that the energy collector assembly will travel through that frog from the straight power conduit to one power conduit diverging from the straight power conduit. Likewise, when the solenoid of the other frog is energized, it acts to switch the path that the energy collector assembly will travel through that frog from the straight power conduit to another power conduit diverging from the straight power conduit. Still referring to the one-solenoid frog described in U.S. Pat. No. 5,390,772, as the energy collector assembly rides through that frog, it engages a deflector arm which mechanically resets the frog to permit travel therethrough in a straight path. Consequently, the next trolley vehicle that wishes to proceed through that frog on the straight power conduit may do so without the need for any switching of the path.

Various other frogs are configured so that, when the solenoid is energized, the energy collector assembly will travel straight through that frog on the straight power conduit. The energy collector assembly, as it rides through this type of frog, then engages the deflector arm which mechanically resets the frog to permit travel therethrough from the straight power conduit to a left or right diverging power conduit. The next trolley vehicle that wishes to proceed through the frog on the straight power conduit must then energize the solenoid to switch the path.

Certain other types of frogs, however, do not reset mechanically and must be reset via a separate solenoid. These types of frogs thus contain two solenoids. When one solenoid of the two-solenoid frog is energized, it acts to switch the path that the energy collector assembly will travel from the straight power conduit to one of the power conduits diverging therefrom. When the other solenoid of the two-solenoid frog is energized, it acts to switch the path that the energy collector assembly will travel back to the straight power conduit. Consequently, the next trolley vehicle that wishes to proceed through the two-solenoid frog may be required to switch the path so as to assure it will proceed in the direction it intends. The instant invention is capable of controlling the operation of a trolley pole switch no matter which of the aforementioned types of frog(s) is utilized at a given junction of diverging power conduits.

The trolley pole switch alters the path of travel that the energy collector assembly takes therethrough in response to commands received from a controller unit. As described in greater detail in the ensuing paragraphs, the controller unit controls the operation of the trolley pole switch by energizing the frog solenoids. Located in proximity to the trolley pole switch, the controller unit receives signals from a transmitter disposed on a trolley vehicle. The transmitted signals are indicative of a request for the energy collector assembly to proceed through the trolley pole switch in a straight path or veer through it onto either a right path or a left path. The transmitted signals are frequency modulated having resting frequencies centered at 9.2 kHz for a left turn, 11.5 kHz to proceed straight, and 14.0 kHz for a right turn. As a trolley vehicle approaches a junction of diverging power conduits, an operator aboard the trolley vehicle chooses the route of travel that the trolley vehicle is to take at the upcoming junction. The route of travel is chosen via levers or like implements, located in a cab of the trolley vehicle, through which the left, the right or the straight path through the junction may be selected. When a particular route of travel is chosen and its corresponding implement manipulated, the transmitter on the trolley vehicle transmits the appropriate signal to the controller unit. The controller unit receives the signal and generates in response thereto a signal to energize the appropriate solenoid on the trolley pole switch situated at the upcoming junction. The solenoid then acts upon certain elements of the frog to switch the path that the energy collector assembly will take through the trolley pole switch. The trolley vehicle then proceeds through the junction on its chosen route of travel.

Trolley pole switch controller units have been in widespread use in the transit industry for several years prior to the present invention. The typical controller unit includes a radio control board and usually a power supply board. The radio control board includes circuitry for receiving and processing the incoming modulated signals so as to generate intermediate command signals each of which indicative of a command to supply power to an appropriate frog solenoid. The power supply board includes power circuitry for stepping down voltage so as to supply the radio control board with power as well as to supply power to the frog solenoids. In response to each of the three command signals received from the radio control board, the current is switched by an appropriate transistor so that trolley line voltage passes from the power conduit to energize the appropriate solenoid. The solenoid then compels the certain frog elements to switch the path that the energy collector assembly will take through the trolley pole switch.

For those certain prior art controller units that do not include a power supply board, the controller unit includes only the radio board and accompanying power supply circuitry for stepping down voltage so as to supply the radio control board with power. The radio control board still includes circuitry for receiving and processing the incoming modulated signals so as to generate the intermediate command signals. The intermediate command signals, though, are used to drive separate high voltage capacity mechanical relays directly. These relays when actuated directly pass the high voltage of the trolley line to energize the appropriate solenoid of the intended frog. The solenoid then compels the certain frog elements to switch the path that the energy collector assembly will take through the trolley pole switch.

The prior art controller unit contains old technology and therefore exhibits the disadvantages inherent to that technology. Experience has shown that the prior art controller unit oftentimes inadvertently energizes the frog solenoids intermittently in response to spurious noise arising from other radio sources. For example, the radio control boards have proven too sensitive to the transmitted signals emanating from other nearby trolley vehicle transmitters and/or too susceptible to the harmonics of those transmitted signals. Such "false tripping" as it is called, if it occurs while a trolley vehicle is passing through a junction, can cause the energy collector assembly to separate or "dewire" from the overhead power conduit. Dewiring at even low speeds can cause a significant amount of damage to the trolley pole switch, the affected energy collector assembly and the overhead catenary on which it rides.

Experience has shown that the power supply board of the prior art controller unit also has its shortcomings. The power supply board serves in part to step down the 450–770 dc voltage present on the power conduit to the 24 dc volt level required for operation of the radio control board. Because the circuitry on the prior art power supply board dissipates approximately 60 watts of heat in stepping down the voltage, the enclosure in which the prior art power supply board is housed requires vents. Though some heat is carried away by air flowing through the vents, moisture suspended in the air tends to condense on the circuitry. The heat and moisture have been shown to promote oxidation of componentry on the power supply board and affect adversely the operation of the prior art controller unit.

Referring again to those certain prior art controller units that include only a radio control board and the accompanying power supply circuitry, experience has shown that the circuitry on those radio boards and the power supply circuitry are oftentimes damaged by surge voltages arising on the trolley line. These surge voltages are passed to the prior art radio control board via a resistor in the trolley line power supply.

The radio control boards of the prior art controller units have also proven quite vulnerable to cold temperatures. Heating elements or insulation have been used to assure proper operation in cold weather climates.

Other disadvantages relate to the reliability, the size, and the cost of the mechanical elements used in the prior art controller unit. As alluded to previously, the typical power supply board includes mechanical relays for switching power to the frog solenoids. When a relay actuates in response to a command signal received from the radio control board, trolley line voltage passes through the contacts of the relay to energize the appropriate frog solenoid. These mechanical relays, however, are prone to arcing across the contacts due to the high voltages they are required to handle. Arcing tends to damage the relay contacts over time, and excessive arcing has been shown to damage the controller boards. The mechanical nature of the relays and various other components, with all of their attendant parts, further compromises the reliability of the prior art controller unit and imposes higher costs. The size of the relays and other mechanical components, moreover, mandate enclosures large enough to accommodate these bulky components. This too imposes added costs. Consequently, reliability, space and cost constraints alone recommend the present invention.

The present invention constitutes an advance over prior art trolley pole switch controller units in several respects. First, the instant invention more accurately and selectively discriminates the modulated signals received from the trolley vehicle transmitters from the unwanted noise. This eliminates false tripping of the frog solenoids caused by prior art controller units picking up signals from sources other than the intended trolley vehicle. Second, the instant invention also features a fine tuning adjustment that permits a technician to set the receiving range and sensitivity of the device to accommodate variations in field conditions. Third, to switch the path of travel through the trolley pole switch, the instant invention employs semiconductor switching technology to control the switching of high voltage from the power conduit to energize the appropriate frog solenoid. Fourth, the instant invention steps down trolley line voltage without generating nearly as much heat as prior art controller units. Not only does this obviate the need to incorporate vents in the instant invention but also substantially minimizes the likelihood of moisture condensing on the circuitry. Fifth, the instant invention operates dependably over a wide range of temperatures without need of heating elements or thermal insulation. These and other advantages favor the present invention over prior art controller units in terms of cost, space and reliability.

It should be noted that the foregoing background information is provided to assist the reader in understanding the instant invention and any terms of art used herein are not intended to be limited to any specific meaning unless specifically stated otherwise in this specification including the following detailed description.

OBJECTS OF THE INVENTION

It is, therefore, a primary object of the present invention to provide an electronic controller for a trolley pole switch.

Another object of the present invention is to provide an electronic trolley pole switch controller whose signal processing unit accurately and selectively discriminates valid input signals from spurious noise arising from other radio sources thereby substantially reducing the likelihood of false tripping of the trolley pole switch solenoids and of the concomitant damage possible as a result thereof.

Yet another object of the present invention is to provide an electronic trolley pole switch controller whose signal processing unit includes a fine tuning adjustment that permits a technician to set the receiving range and sensitivity of the signal processing unit to accommodate variations in the environment in which the electronic frog controller operates.

Still another object of the present invention is to provide an electronic trolley pole switch controller whose power controlling unit steps down trolley line voltage without generating as much heat as prior art frog controller units thereby obviating the need to ventilate the power controlling unit and substantially minimizing the likelihood of moisture condensing on circuitry housed therein.

Even another object of the present invention is to provide an electronic trolley pole switch controller whose signal processing unit includes time out circuitry that assures that a frog solenoid will not be energized continuously and thus damaged in the event that an incoming signal is continuously received from a trolley vehicle transmitter.

A further object of the present invention is to provide an electronic trolley pole switch controller capable of operating within various environments wherein the temperature can range from −40° to 70° Celsius.

Yet a further object of the present invention is to provide an electronic trolley pole switch controller that is more reliable, less expensive, and occupies less space than prior art frog controller units.

Still a further object of the present invention is to provide an electronic trolley pole switch controller that is implemented through semiconductor technology rather than through traditional mechanical componentry.

Even a further object of the present invention is to provide an electronic trolley pole switch controller for generating a pulse used to energize the appropriate frog solenoid of the trolley pole switch wherein the duration of the pulse is adjustable so that in colder climates which cause trolley pole switches to operate more slowly the pulse is of sufficient length to assure that the trolley pole switch completely switches to the appropriate setting and in warmer climates which cause trolley pole switches to operate more quickly the pulse is of sufficient brevity to assure that the frog solenoids will not overheat and become damaged.

In addition to the objects and advantages of the invention set forth above, various other objects and advantages will become more readily apparent to persons skilled in the trolley vehicle art from the detailed description of the invention, particularly when considered in conjunction with the attached drawings and with the appended claims.

SUMMARY OF THE INVENTION

In a presently preferred embodiment, the present invention provides an electronic controller for controlling a trolley pole switch. The trolley pole switch has at least one frog for switching the path of travel that an energy collector of a trolley pole takes through the trolley pole switch at a junction of power conduits at which a turn power conduit and a straight power conduit diverge from the straight power conduit. The electronic trolley pole switch controller includes a signal processing means and a power controlling means employed in tandem to control the frog solenoids of a trolley pole switch. The signal processing means detects and processes both a modulated turn signal and a modulated straight signal. The modulated turn signal is indicative of a request to switch the path of travel through the at least one frog to the turn power conduit. The modulated straight signal is indicative of a request to switch the path of travel through the at least one frog to the straight power conduit. In response to the modulated turn signal, the signal processing means generates an intermediate turn command signal indicative of a command to supply power to the frog turn solenoid. In response to the modulated straight signal, the signal processing means generates an intermediate straight command signal indicative of a command to supply power to the frog straight solenoid. When the power controlling means receives the intermediate turn command signal, it switches power to the frog turn solenoid thereby effecting the switch in the path of travel through the trolley pole switch to the turn power conduit. When the power controlling means receives the intermediate straight command signal, it switches power to the frog straight solenoid thereby effecting the switch in the path of travel through the trolley pole switch to the straight power conduit.

BRIEF DESCRIPTION OF THE DRAWINGS

FIG. 1A is a block diagram of an electronic trolley pole switch controller, according to the present invention, showing a signal processing unit and a power controlling unit.

FIG. 1C is a block diagram of a frequency detection stage of the signal processing unit shown FIG. 1A.

DETAILED DESCRIPTION OF THE INVENTION

Figure 1B:
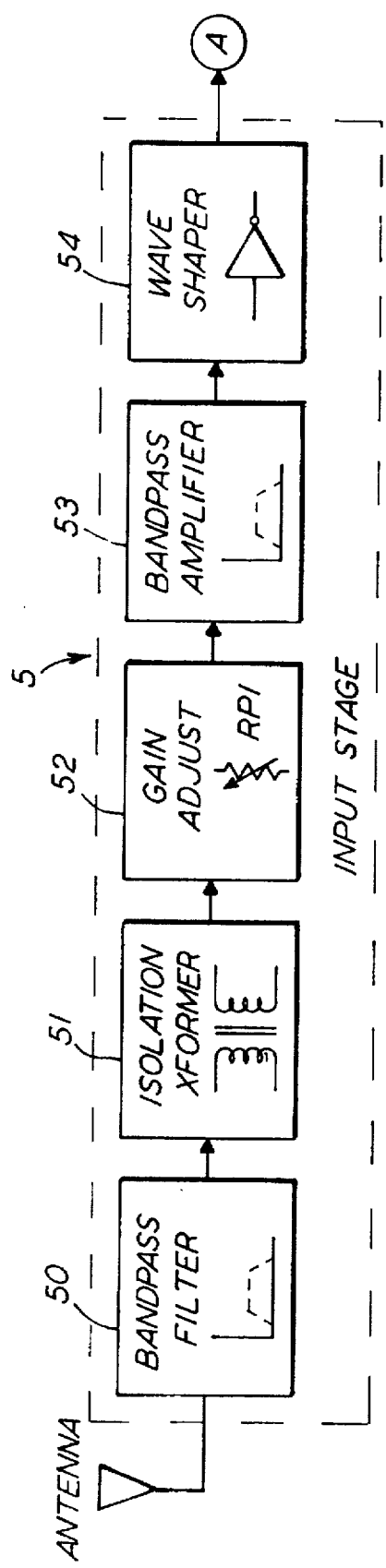
FIG. 1B is a block diagram of an input stage of the signal processing unit shown in FIG. 1A.

Before describing the present invention in detail, for the sake of clarity and understanding, the reader is advised that identical components having identical functions in each of the accompanying drawings have been marked with the same reference numerals throughout each of the several Figures illustrated herein.

In the presently preferred embodiment of the instant invention illustrated in FIG. 1A, the electronic trolley pole switch controller 1 includes a signal processing means 2 and a power controlling means 3 employed in tandem to control the frog solenoids of a trolley pole switch.

The signal processing means 2 receives frequency modulated signals, through an antenna, from a transmitter situated on a trolley vehicle. As alluded to previously, the transmitter may transmit any one of three frequency modulated signals. A frequency modulated straight signal indicates a request to switch the path of travel through a frog so that an energy collector assembly rides straight therethrough on a power conduit strung in a straight path. A frequency modulated left turn signal indicates a request to switch the path of travel so that an energy collector assembly rides from the straight power conduit to one strung to a left direction. Likewise, a frequency modulated right turn signal indicates a request to switch the path of travel so that an energy collector assembly rides from the straight power conduit to one strung to a right direction.

The frequency of each modulated signal lies within a band of frequencies predetermined by the circuit design of the transmitter. This predetermined band extends approximately from 8.8 kHz to 14.9 kHz. Specifically, the frequency modulated left turn signal has its resting frequency centered at 9.2 kHz which varies between a preset range of 8.8 kHz to 9.5 kHz by virtue of the left turn modulation signal it carries. The frequency modulated straight signal has its resting frequency centered at 11.5 kHz which varies between a preset range of 11.1 kHz to 11.95 kHz by virtue of the straight modulation signal it carries. Likewise, the frequency modulated right turn signal has its resting frequency centered at 14 kHz which varies between a preset range of 13.4 kHz to 14.6 kHz by virtue of the right turn modulation signal it carries. These are the modulated signals, whose frequencies lie within the predetermined band, that the signal processing means 2 must detect and process.

The signal processing means 2 processes the frequency modulated signals through several stages to generate ultimately intermediate commands signals to control the supply of power to the frog solenoids of the various trolley pole switches. Specifically, the signal processing means 2 generates an intermediate straight command signal in response to the frequency modulated straight signal. The signal processing means 2 likewise generates intermediate right turn and intermediate left turn command signals in response to the frequency modulated right and left turn signals, respectively.

The power controlling means 3 receives the intermediate command signals from the signal processing means 2 and in response to each such signal supplies power to the particular frog solenoid corresponding to the intermediate command signal received. The particular frog solenoid energizes and acts upon certain elements within that frog to switch the path of travel that the energy collector assembly will take through the frog to the desired power conduit.

Referring now to FIGS. 1A–F and 2A–F, the signal processing unit 2 includes a voltage conversion stage 4, a signal input stage 5, a frequency detection stage 6, a turn signal demodulation stage 7, a straight signal demodulation stage 8 and an output stage 9.

Figure 2A:
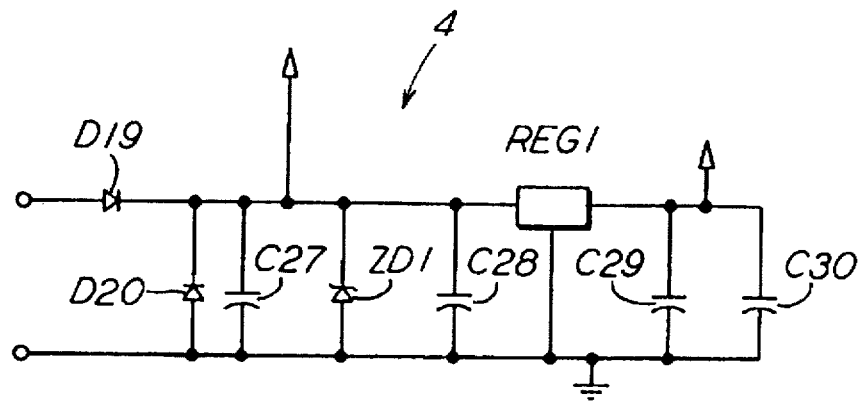
FIG. 2A is a schematic of a voltage conversion stage of the signal processing unit according to the present invention.

The voltage conversion stage 4 receives from the power controlling unit 3 an input voltage of 24 volts dc as shown in FIG. 2A. The voltage conversion stage 4 reduces the 24 volts dc input to 15 volts dc and regulates same. Each of the other stages of the signal processing unit 2 uses the 15 volts dc internally to power its operations.

Figure 2B:
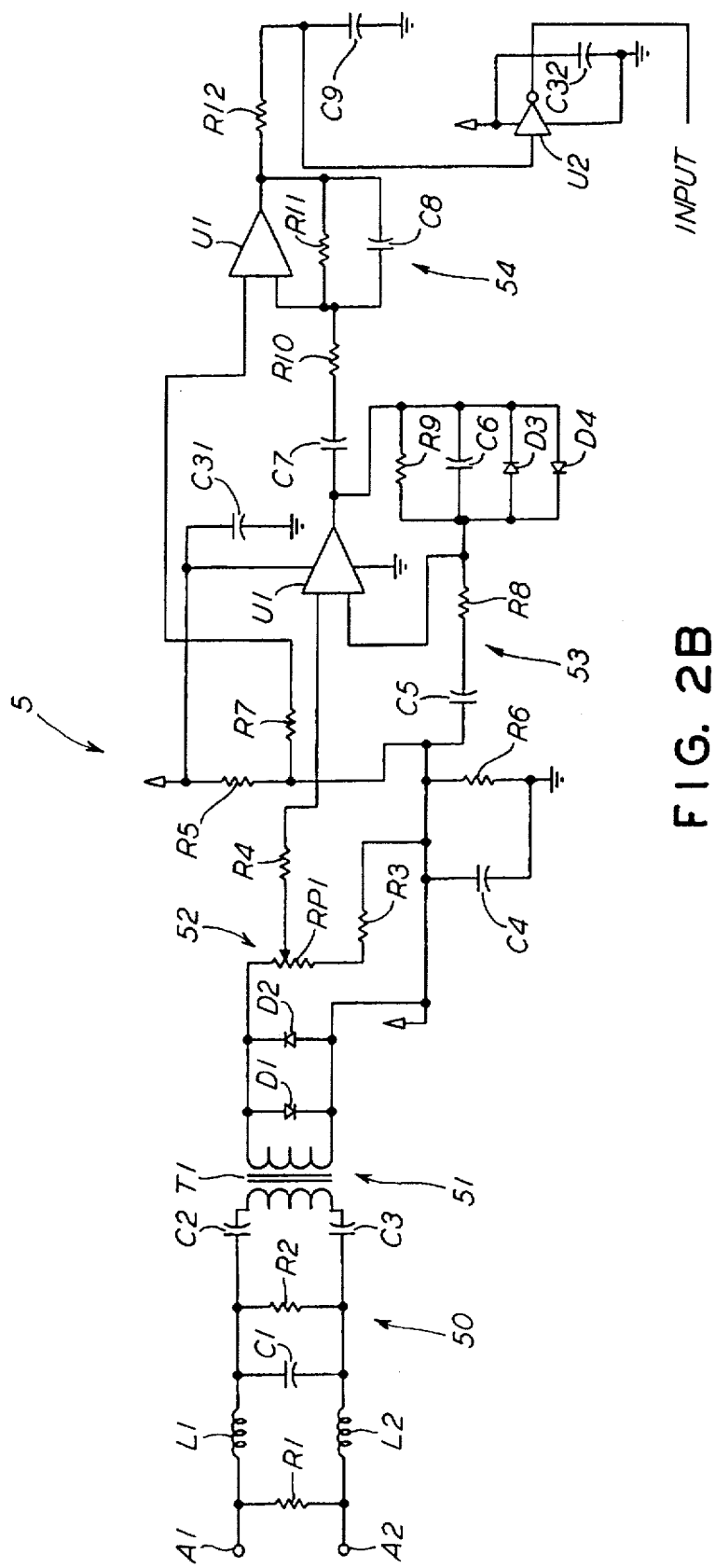
FIG. 2B is a schematic of a signal input stage of the signal processing unit according to the present invention.

As illustrated in FIGS. 1B and 2B, the signal input stage 5 filters, amplifies and shapes each modulated signal received from the antenna and outputs a conditioned modulated signal in response. For the sake of clarity, the signal input stage 5 generates a conditioned modulated straight signal in response to the frequency modulated straight signal. Likewise, the signal input stage 5 generates conditioned modulated left and conditioned modulated right turn signals, respectively, in response to the modulated left and modulated right turn signals received from the antenna.

The signal input stage 5 includes a bandpass filter circuit 50, an isolation circuit 51, a gain adjusting circuit 52, a bandpass amplifier circuit 53, and a first signal shaping circuit 54. The bandpass filter circuit 50 filters each of the inputted frequency modulated signals received from the antenna so that frequencies outside the predetermined band are substantially attenuated and frequencies within the predetermined band are allowed to pass therethrough. A filtered modulated signal emerges from the bandpass filter circuit 50 for each of the frequency modulated signals received at the signal input stage 5. The predetermined band of frequencies allowed to pass through the bandpass filter circuit 50 ranges approximately from 8.8 kHz to 14.9 kHz. The filtered modulated signal that emerges from the bandpass filter circuit 50 then passes through the isolation circuit 51. The isolation circuit 51 serves to isolate the electronic circuitry contained within the signal processing unit 2 from undesirable electrical influences arising from other electrical circuitry and the high voltage trolley line. The filtered modulated signal then flows through the gain adjusting circuit 52.

The gain adjusting circuit 52 allows the sensitivity of the signal input stage 5 to be adjusted. Specifically, the gain adjusting circuit 52 includes a variable resistor RP1 as shown in FIGS. 1B and 2B. Subsequent to the manufacture of the signal processing unit 2, a plant technician may use RP1 to calibrate the signal input stage 5, and thus the signal processing unit 2, to best respond to the modulated signals transmitted from the trolley vehicle. The initial calibration of the signal input stage 5, however, is usually performed under the nearly ideal test conditions of the manufacturing plant. Nevertheless, the signal processing unit 2 is preferably made so that RP1 is accessible to technicians in the field. Through adjustment of RP1, a field technician may finely tune the signal input stage 5 to accommodate variations in the strength of the transmitted signals typically encountered under field conditions.

The bandpass amplifier circuit 53 amplifies the filtered modulated signal received from the gain adjuster circuit 52 so that frequencies within the predetermined band are allowed to pass therethrough with substantially uniform response. An amplified modulated signal emerges from the bandpass amplifier circuit 53 for each of the filtered modulated signals received from the gain adjusting circuit 52. Like the bandpass filter circuit 50, the predetermined band of frequencies passable through the bandpass amplifier circuit 53 ranges approximately from 8.8 kHz to 14.9 kHz.

The amplified modulated signal then passes into the first signal shaping circuit 54 of the signal input stage 5. The first signal shaping circuit 54 improves the condition of the amplified modulated signal so that its amplitude is consistent and its wave edges exhibit smooth, steep transitions. It also provides a degree of filtering. The first signal shaping circuit 54 thus provides the requisite conditioning of the amplified modulated signal prior to passing it, as the conditioned modulated signal, to each of the frequency detection 6, turn signal demodulation 7, straight signal demodulation 8 stages of the signal processing unit 2.

Figure 2D:
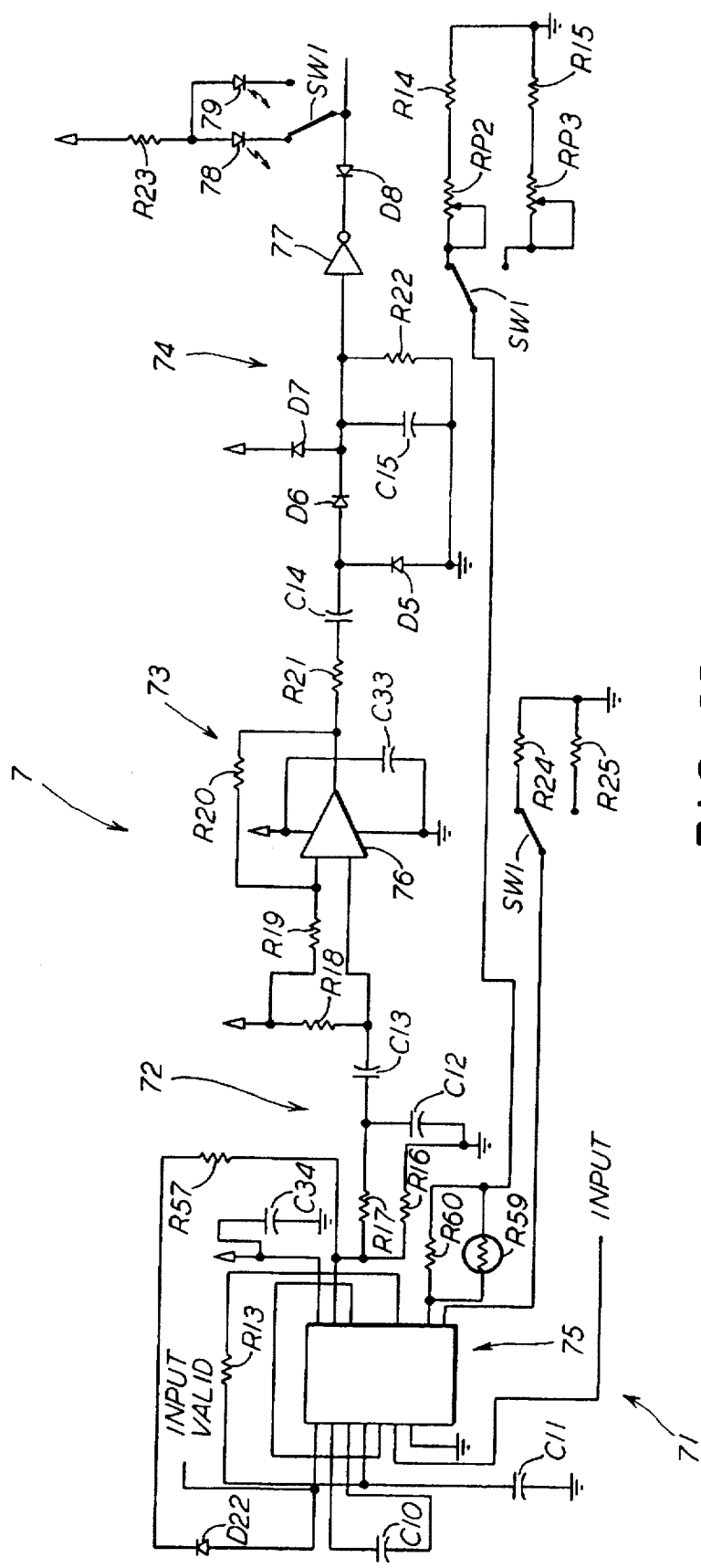
FIG. 2D is a schematic of a turn signal demodulation stage of the signal processing unit according to the present invention.
Figure 2E:
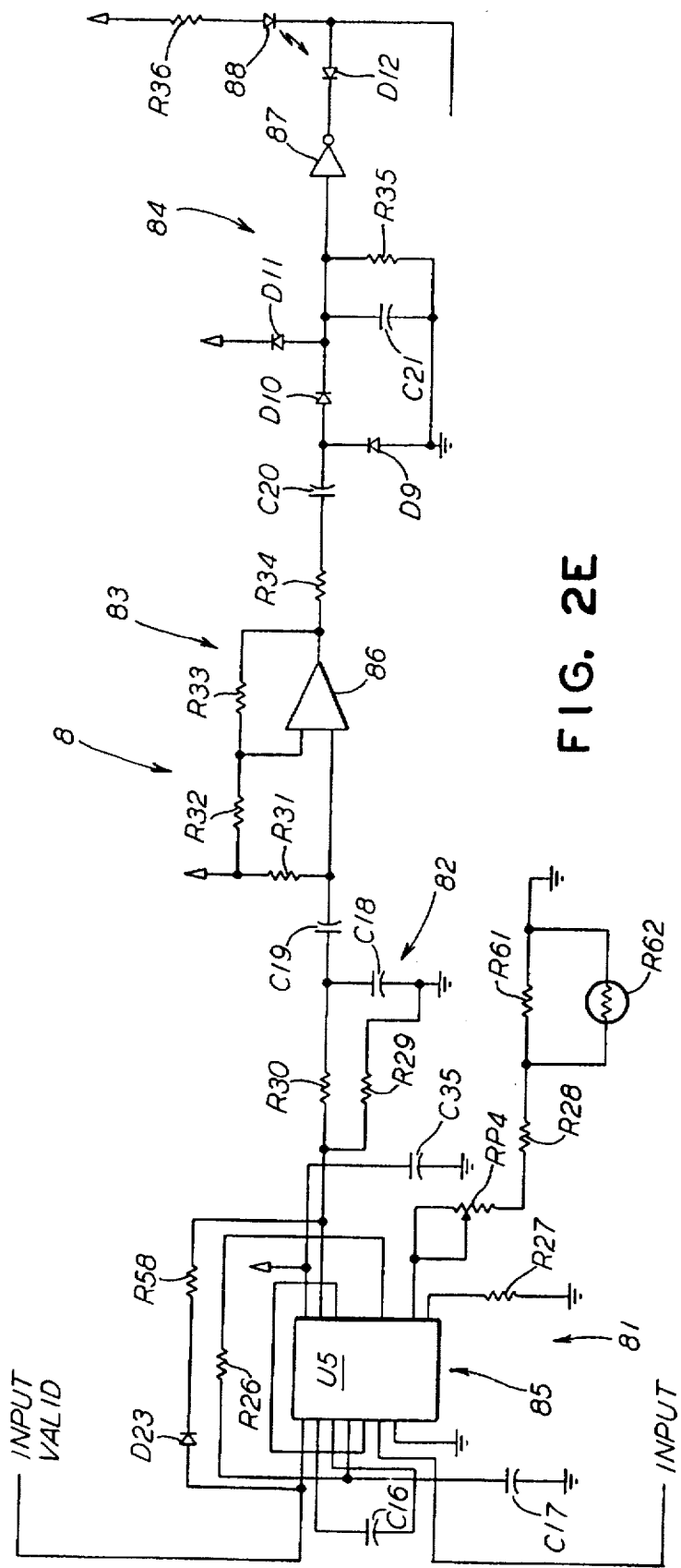
FIG. 2E is a schematic of a straight signal demodulation stage of the signal processing unit according to the present invention.
Figure 2F:
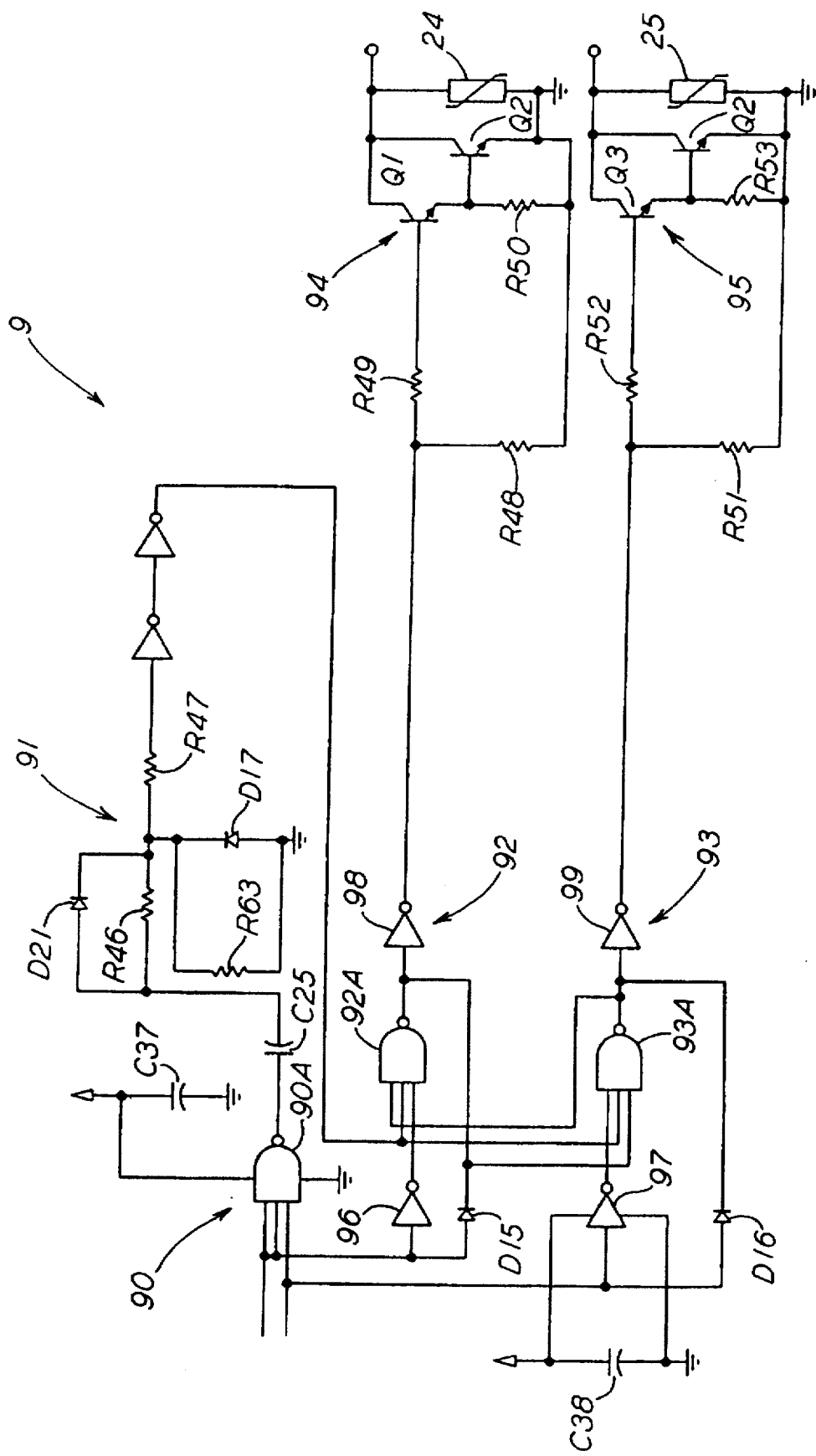
FIG. 2F is a schematic of an output stage of the signal processing unit according to the present invention.
Figure 2C:
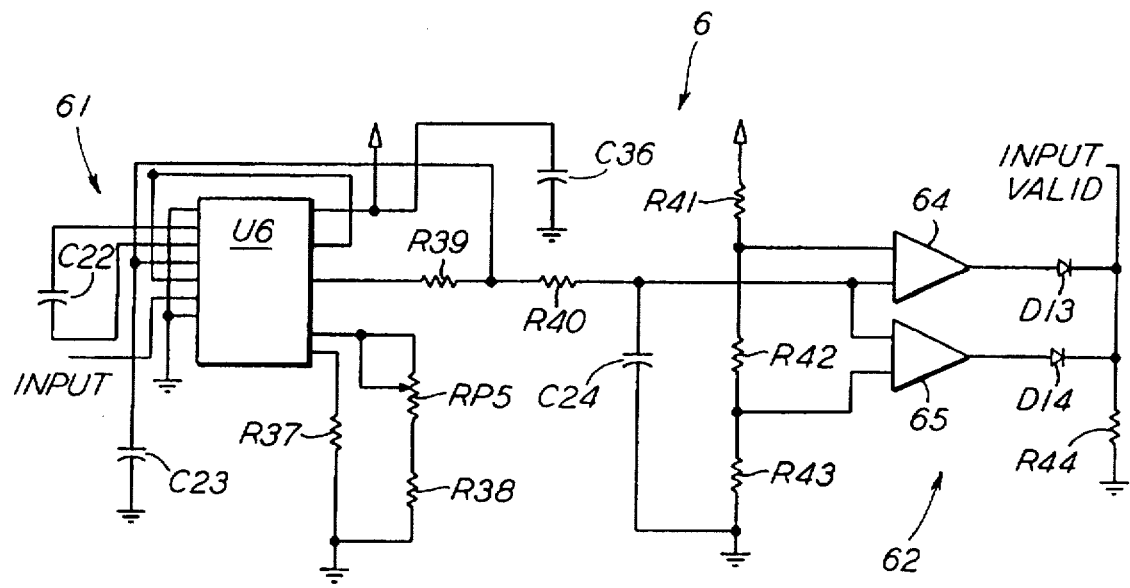
FIG. 2C is a schematic of a frequency detection stage of the signal processing unit according to the present invention.

Referring now to FIGS. 1C and 2C, the frequency detection stage 6 of the signal processing unit 2 detects whether the frequency of the conditioned modulated signal received from the signal input stage 5 falls within the predetermined band of frequencies. If so, the frequency detection stage 6 generates a validation signal in response. The validation signal indicates that the conditioned modulated signal, and thus the modulated signal received from the antenna, is one which either the turn signal or straight signal demodulation stages 7,8 can demodulate. The validation signal in essence serves to enable either of the turn and straight signal demodulation stages 7,8 to operate in response to the conditioned modulated turn and straight signals, respectively.

The frequency detection stage 6 includes a first phase lock loop circuit 61 and a first level comparator circuit 62 as shown in FIGS. 1C and 2C. The first phase lock loop circuit 61 includes a PLL chip or like circuitry 63 and a variable resistor RP5. Variable resistor RP5 allows adjustment of the predetermined band of frequencies detectable by the first phase lock loop circuit 61. The first level comparator circuit 62 includes two comparators 64 and 65, a resistor R40, a capacitor C24 and resistors R41 through R43.

The first phase lock loop circuit 61 receives its input from the first signal shaping circuit 54 of the signal input stage 5. Assuming, of course, that the input is of sufficient strength, the first phase lock loop circuit 61 will lock onto the incoming conditioned modulated signal if its frequency lies within the predetermined band of frequencies. Setup as a frequency to voltage converter, the output of first phase lock loop circuit 61 is a square wave whose frequency is that of the conditioned modulated signal and whose amplitude at any given time is representative of the instantaneous frequency of the conditioned modulated signal. Prior to passage of the square wave signal into the first level comparator circuit 62, resistor R40 and capacitor C24 serve as a filter to suppress rippling without affecting the dc component of the signal. Forming the time constant of a resistance-capacitance circuit, the values of R40 and C24 also determine how long the input signal must be present at the input of the first phase lock loop circuit 61 for the resulting square wave signal to be recognized by the first level comparator circuit 62. If the conditioned modulated signal is present at that input for a sufficient amount of time, the first phase lock loop circuit 61 will produce a square wave carrying enough energy to charge up capacitor C24 so that the first level comparator circuit 62 can analyze the amplitude of square wave signal.

The first level comparator circuit 62 receives the square wave signal from the first phased lock loop circuit 61.

Resistors R41 and R43 are selected so that the first level comparator circuit 62 will generate a validation signal, i.e., a logical high signal, if the amplitude of the square wave represents a frequency whose value lies between the upper and lower frequencies or limits of the predetermined band. If the amplitude of the square wave represents a frequency whose value lies outside the predetermined band, then the first level comparator circuit 62 supplies no output signal.

Resistors R41 and R43 thus set the upper and lower voltage thresholds, respectively, for the first level comparator circuit 62 while resistor R42 sets the midpoint between the thresholds. Specifically, resistor R41 is selected so that comparator 64 recognizes the square wave when its amplitude represents a frequency lower than the upper limit of the predetermined band. Likewise, resistor R43 is selected so that comparator 65 recognizes the square wave when its amplitude represents a frequency higher than the lower limit of the predetermined band. When the amplitude of the square wave falls within the upper and lower voltage thresholds of the first level comparator circuit 62, the first level comparator circuit 62 supplies the validation signal to both of the turn signal and straight signal demodulation stages 7 and 8.

It should be apparent that the first phase lock loop circuit 61 will not be able to lock onto the incoming conditioned modulated input signal if its frequency lies outside of the predetermined band of frequencies. Without a valid incoming conditioned modulated signal to process, the frequency detection stage 6 will not generate a validation signal and neither the turn signal nor straight signal demodulation stages 7 and 8 will be enabled to operate. The frequency detection stage 6 merely determines whether the frequency of the incoming signal lies within the predetermined band. The frequency detection stage 6 neither distinguishes whether the incoming modulated signal represents a straight, left turn or right turn request nor demodulates same.

Each signal processing unit 2 includes both a turn signal demodulation stage 7 and a straight signal demodulation stage 8. As alluded to earlier, the turn signal demodulation stage 7 envisioned herein is designed to demodulate either a modulated left turn signal or a modulated right turn signal. Given the teaching herein, however, one skilled in the relevant art could construct one capable of demodulating both turn signals. Such a construction is, therefore, within the scope of the instant invention. Notwithstanding such a construction, the signal processing unit 2 envisioned herein is preferably set to process either straight and left turn requests or straight and right turn requests.

Whichever pair of requests that a given signal processing unit is to be set to process, the phase lock loop circuitry of the demodulation stages must each be preset to detect the proper range of frequencies. The preset frequency ranges must, of course, match those used by the transmitters aboard the trolley vehicles. For a signal processing unit set to process left turn and straight requests, the preset ranges of frequencies for the turn signal demodulation stage and the straight signal demodulation stage lie within 8.8 kHz to 9.5 kHz and 11.1 kHz to 11.95 kHz, respectively. Similarly, for a signal processing unit set to process straight and right turn requests, the preset ranges of frequencies for the straight signal demodulation stage and the turn signal demodulation stage lie within 11.1 kHz to 11.95 kHz and 13.4 kHz to 14.6 kHz, respectively. Each demodulation stage is thus tuned to capture a different narrow preset range of frequencies and this ensures that one demodulation stage will not respond to a modulated signal intended for the other demodulation stage.

Referring to FIGS. 1D–E and 2D–E, the turn and straight signal demodulation stages 7 and 8 each include phase lock loop circuitry, filter circuitry, signal shaping circuitry and level comparator circuitry. Consider first, however, the turn signal demodulation stage 7 illustrated in FIGS. 1D and 2D. Specifically, the turn signal demodulation stage 7 includes a switch SW1, a second phase lock loop circuit 71, a second low pass filter circuit 72, a second signal shaping circuit 73, and a second level comparator circuit 74.

A given signal processing unit is set through SW1 of the turn signal demodulation stage 7 to recognize either straight and right modulated signals or straight and left modulated signals. Primarily affecting switch second phase lock loop circuit 71, when switch SW1 is switched left as indicated, the turn signal demodulation stage 7 is tuned so that it will respond only to a conditioned modulated left turn signal. When switch SW1 is switched right, the turn signal demodulation stage 7 is tuned so that it will respond only to a conditioned modulated right turn signal. The straight signal demodulation stage 8, as explained subsequently, is tuned so that it will respond only to a conditioned modulated straight signal.

Figure 1D:
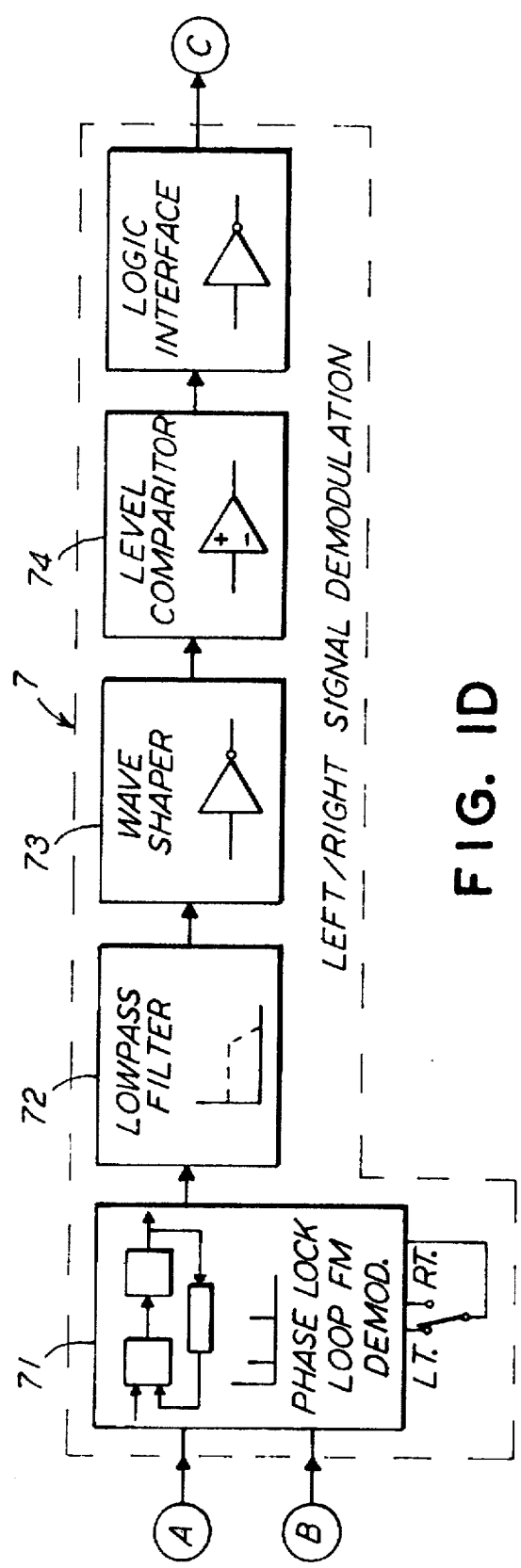
FIG. 1D is a block diagram of a turn signal demodulation stage of the signal processing unit shown in FIG. 1A.

Setup as a demodulator, the second phase lock loop circuit 71 includes switch SW1, a PLL chip or like circuitry 75, and variable resistors RP2 and RP3. If switch SW1 is set in the left position as shown in FIGS. 1D and 2D, signal processing unit 2 will detect a conditioned modulated left turn signal whose frequency may vary up to approximately 300 Hz above or below a resting frequency of 9.2 kHz depending upon the left turn modulation signal carried thereby. Through variable resistor RP2, the center frequency detectable by the second phase lock loop circuit 71 may be adjusted to account for variations in the environment in which the signal processing unit is used. Conversely, if switch SW1 is set in the right position, signal processing unit 2 will detect a conditioned modulated right turn signal whose frequency may vary up to approximately 600 Hz above or below a resting frequency of 14 kHz depending upon the right turn modulation signal carried thereby. As with variable resistor RP2, variable resistor RP3 allows a field technician to adjust the center frequency detectable by the second phase lock loop circuit 71 to accommodate the particular environmental conditions encountered in the field.

Regarding the operation of the second phase lock loop circuit 71, refer to FIG. 2D. Whether the turn signal demodulation stage 7 is set to process left or right turn requests, the second phase lock loop circuit 71 receives both the conditioned modulated turn signal from the signal input stage 5 and the validation signal from the frequency detection stage 6. In response to these inputs, the second phase lock loop circuit 71 outputs a square wave signal whose frequency is that of the turn modulation signal carried by the conditioned modulated turn signal and whose amplitude represents variations of the turn modulation signal. The second phase lock loop circuit 71 will not capture the turn modulation signal carried by the conditioned modulated turn signal if the frequency of the turn modulation signal is too high. Specifically, for a turn signal demodulation stage set to process left turn requests, a left turn modulation signal exceeding approximately 300 Hz will not be captured. This corresponds to the preset range of frequencies for a conditioned modulated left turn signal of 8.8 kHz to 9.5 kHz. Likewise, for a turn signal demodulation stage set to process right turn requests, a right turn modulation signal exceeding approximately 600 Hz will not be captured. This corresponds to the preset range of frequencies for a conditioned modulated right turn signal of 13.4 kHz to 14.6 kHz.

Accompanying the conditioned modulated turn signal from the signal input stage 5, however, is a certain amount of spurious noise. The square wave that emerges from the second phase lock loop circuit 71 thus passes through the second low pass filter circuit 72. Represented primarily by resistor R17 and capacitor C12, the second low pass filter circuit 72 removes unwanted noise from the square wave signal such that frequencies above a preselected frequency are substantially attenuated and frequencies below the preselected frequency are allowed to pass therethrough. The preselected frequency corresponds to the preset range of frequencies for each of the turn modulation signals. Specifically, for a turn signal demodulation stage set to process left turn requests, the second low pass filter circuit filters unwanted frequencies above approximately 300 Hz. Likewise, for a turn signal demodulation stage set to process right turn requests, the second low pass filter circuit filters unwanted frequencies above approximately 600 Hz.

The filtered square wave signal then passes into the second signal shaping circuit 73 of the turn signal demodulation stage 7. As illustrated in FIG. 2D, the second signal shaping circuit 73 includes capacitors C13 and C14, op amp 76 and resistors R18 through R21. The second signal shaping circuit 73 improves the condition of the filtered square wave signal so that its amplitude is consistent and its wave edges exhibit smooth, steep transitions. It also provides a degree of filtering. The second signal shaping circuit 73 thus provides the requisite conditioning of the square wave signal prior to passing it to the second level comparator circuit 74.

The second level comparator circuit 74 includes rectifier diode D6, resistor R22, capacitor C15 and inverter 77. Diodes D5 and D7 are employed primarily for clamping the input to the second level comparator circuit 74 for protection. Forming the time constant of a resistance-capacitance circuit, the values of R22 and C15 determine how long the modulated turn signal must be present at the input of the second phase lock loop circuit 71 for the resulting square wave signal to be recognized by the second level comparator circuit 74. If the conditioned modulated turn signal is present at that input for a sufficient amount of time, the second phase lock loop circuit 71 will produce a square wave carrying enough energy to charge up capacitor C15 so that the second level comparator circuit 74 can analyze the amplitude of square wave signal.

Whereas the second phase lock loop circuit 71 checks whether the frequency of the turn modulation signal is too high, the second level comparator circuit 74 checks whether it is too low. The frequency of the modulation signal must then lie between an upper limit set by the second phase lock loop circuit 71 and a lower limit set by the second level comparator circuit 74. As to the lower limit, diode D6 rectifies the incoming square wave signal so as to form a reference dc level therefrom for input into the inverter 77. The reference dc level, of course, is a voltage representation of the frequency of the turn modulation signal carried by the conditioned modulated turn signal. If the reference dc level carries sufficient energy to charge capacitor C15 and overcome the built in threshold of inverter 77, then the frequency of the turn modulation signal represented by that reference level is high enough to warrant activation of the output stage 9.

It is primarily through the second phase lock loop circuit 71 and the second level comparator circuit 74 that a valid incoming turn signal is distinguished from spurious noise including intermittent signals received from transmitters of other, far more remote trolley vehicles. Prior art radio boards have proven vulnerable to such intermittent signals as evidence by false tripping of the frog turn solenoids as noted in the background. The design of the signal processing unit 2, however, overcomes this problem.

Returning to the operation of the turn signal demodulation stage 7, when a reference dc level of sufficiently high strength is received, inverter 77 outputs a low logic signal. This low logic signal indicates that a valid modulated turn signal has been received and processed by the turn signal demodulation stage 7. Inverter 77 somewhat amplifies the low logic signal before passing it to the output stage 9 and also drives one of two light emitted diodes (LEDs) or like visual indicators. Exactly which LED is driven depends on the setting of switch SW1 as described previously. If SW1 is set in the left position, then the left LED 78 is illuminated. If SW1 is set in the right position, then the right LED 79 will be illuminated.

Figure 1E:
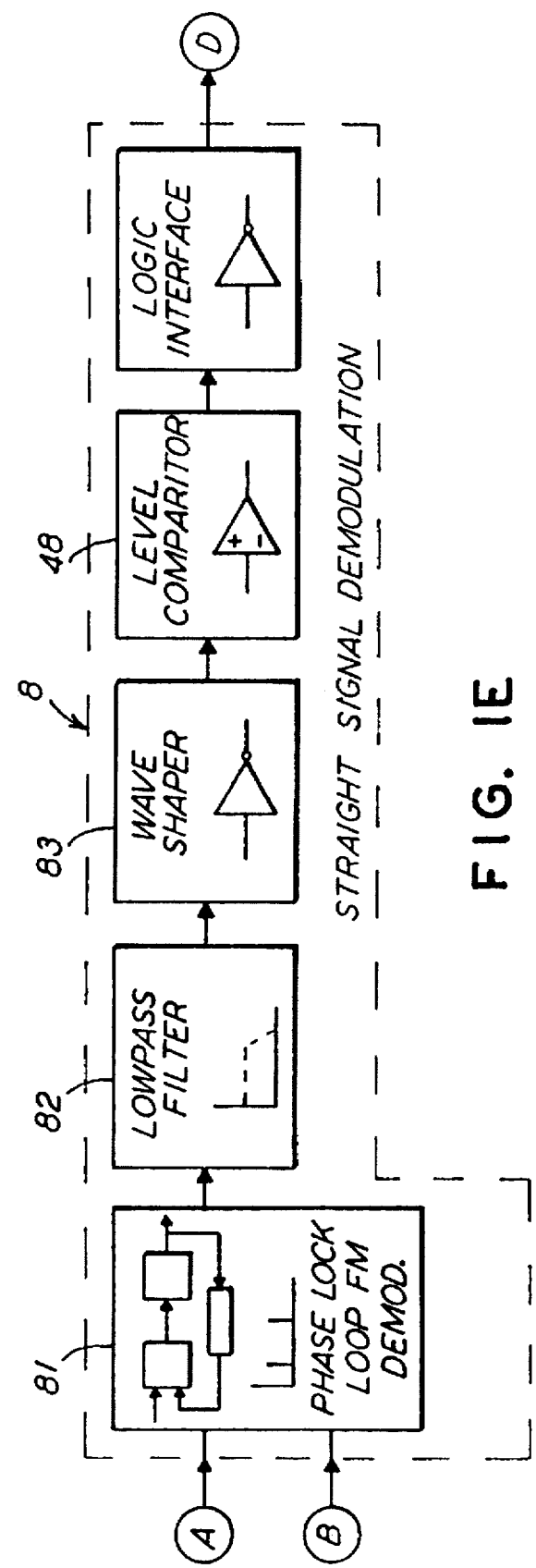
FIG. 1E is a block diagram of a straight signal demodulation stage of the signal processing unit shown in FIG. 1A.

Consider now the straight signal demodulation stage 8 illustrated in FIGS. 1E and 2E. The straight signal demodulation stage 8 includes a third phase lock loop circuit 81, a third low pass filter circuit 82, a third signal shaping circuit 83, and a third level comparator circuit 84. Setup as a demodulator, the third phase lock loop circuit 81 includes a PLL chip or like circuitry 85 and variable resistor RP4. The straight signal demodulation stage 8 will detect a conditioned modulated straight signal whose frequency may vary up to approximately 400 Hz above or below a resting frequency of 11.5 kHz depending upon the straight modulation signal carried thereby. As with variable resistors RP2 and RP3 of the turn signal demodulation stage 7, variable resistor RP4 allows a field technician to adjust the center frequency detectable by the third phase lock loop circuit 81 to accommodate the particular environmental conditions encountered in the field.

Regarding the operation of the third phase lock loop circuit 81, the third phase lock loop circuit 81 receives both the conditioned modulated straight signal from the signal input stage 5 and the validation signal from the frequency detection stage 6. In response to these inputs, the third phase lock loop circuit 81 outputs a square wave signal whose frequency is that of the straight modulation signal carried by the conditioned modulated straight signal and whose amplitude represents variations of the straight modulation signal. The third phase lock loop circuit 81 will not capture the straight modulation signal carried by the conditioned modulated straight signal if the frequency of the straight modulation signal is too high. Specifically, a straight modulation signal exceeding approximately 400 Hz will not be captured. This corresponds to the preset range of frequencies for a conditioned modulated straight signal of 11.1 kHz to 11.95 kHz.

Accompanying the conditioned modulated straight signal from the signal input stage 5, however, is the aforementioned spurious noise. The square wave that emerges from the third phase lock loop circuit 81 thus passes through the third low pass filter circuit 82. Represented primarily by resistor R30 and capacitor C18, the third low pass filter circuit 82 removes unwanted noise from the square wave signal such that frequencies above a preselected frequency are substantially attenuated and frequencies below the preselected frequency are allowed to pass therethrough. This preselected frequency corresponds to the preset range of frequencies for the straight modulation signal. Specifically, the third low pass filter circuit 82 filters unwanted frequencies above approximately 400 Hz.

The filtered square wave signal then passes into the third signal shaping circuit 83 of the straight signal demodulation stage 8. As illustrated in FIG. 2E, the third signal shaping circuit 83 includes capacitors C19 and C20, op amp 86 and resistors R31 through R34. The third signal shaping circuit 83 improves the condition of the filtered square wave signal so that its amplitude is consistent and its wave edges exhibit smooth, steep transitions. It also provides a degree of filtering. The third signal shaping circuit 83 thus provides the requisite conditioning of the square wave signal prior to passing it to the third level comparator circuit 84.

The third level comparator circuit 84 includes rectifier diode D10, resistor R35, capacitor C21 and inverter 87. Diodes D9 and D10 are employed primarily for clamping the input to the third level comparator circuit 84 for protection. Forming the time constant of a resistance-capacitance circuit, the values of R35 and C21 determine how long the modulated straight signal must be present at the input of the third phase lock loop circuit 81 for the resulting square wave signal to be recognized by the third level comparator circuit 84. If the conditioned modulated straight signal is present at that input for a sufficient amount of time, the third phase lock loop circuit 81 will produce a square wave carrying enough energy to charge up capacitor C21 so that the third level comparator circuit 84 can analyze the amplitude of square wave signal.

Whereas the third phase lock loop circuit 81 checks whether the frequency of the straight modulation signal is too high, the third level comparator circuit 84 checks whether it is too low. The frequency of the straight modulation signal must then lie between an upper limit set by the third phase lock loop circuit 81 and a lower limit set by the third level comparator circuit 84. As to the lower limit, diode D10 rectifies the incoming square wave signal so as to form a reference dc level therefrom for input into the inverter 87. The reference dc level, of course, is a voltage representation of the frequency of the straight modulation signal carried by the conditioned modulated straight signal. If the reference dc level carries sufficient energy to charge capacitor C21 and overcome the built in threshold of inverter 87, then the frequency of the straight modulation signal represented by that reference level is high enough to warrant activation of the output stage 9.

It is primarily through the third phase lock loop circuit 81 and the third level comparator circuit 84 that a valid incoming straight signal is distinguished from spurious noise including intermittent signals received from transmitters of other, far more remote trolley vehicles. Prior art radio boards have proven vulnerable to such intermittent signals as evidence by false tripping of the frog straight solenoids as noted in the background. The design of the signal processing unit 2, however, overcomes this problem.

Returning to the operation of the straight signal demodulation stage 8, when a reference dc level of sufficiently high strength is received, inverter 87 outputs a low logic signal. This low logic signal indicates that a valid modulated straight signal has been received and processed by the straight signal demodulation stage 8. Inverter 87 somewhat amplifies the low logic signal before passing it to the output stage. Inverter 87 also drives an LED or like visual indicator 88 as it outputs the low logic signal.

Figure 1F:
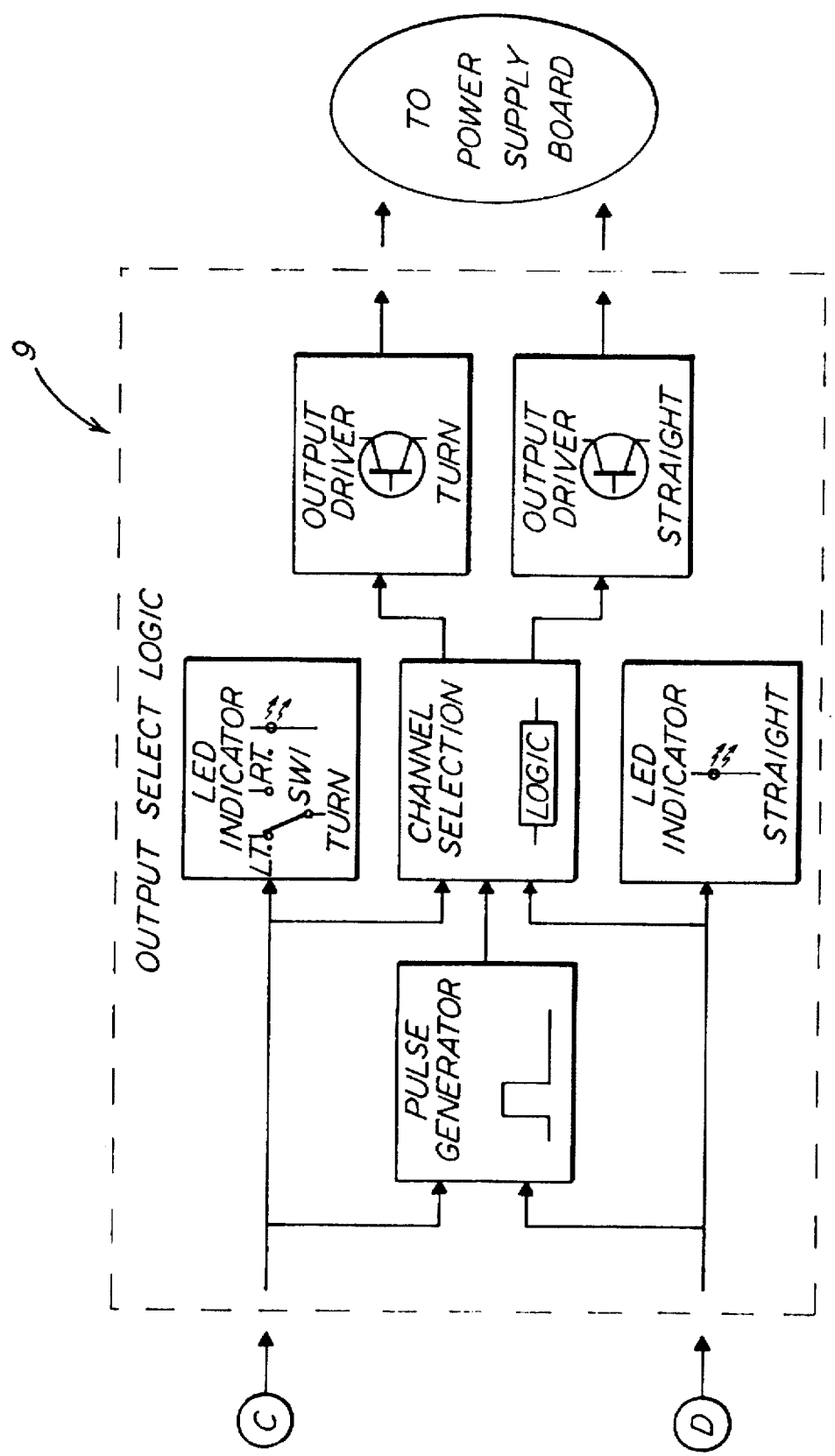
FIG. 1F is a block diagram of an output stage of the signal processing unit shown in FIG. 1A.

Referring to FIGS. 1F and 2F, the output stage 9 includes a pulse generator circuit 91, logic circuitry, a turn driver circuit 94 and a straight driver circuit 95. The logic circuitry includes an input logic circuit 90 inclusive of NAND gate 90A, a turn logic circuit 92 inclusive of NAND gate 92A and a straight logic circuit 93 inclusive of NAND gate 93A. The input logic circuit 90 is located at the input of the output stage 9 and connects to both of the turn signal and straight signal demodulation stages 7 and 8. Each of the turn and straight logic circuits 92 and 93 also connect to both of the demodulation stages. Specifically, the turn logic circuit 92 receives the output of the turn signal demodulation stage 7 through an inverter 96 and the output of the straight signal demodulation stage 8. Similarly, the straight logic circuit 93 receives the output of the straight signal demodulation stage 8 through another inverter 97 and the output of the turn signal demodulation stage 7. The turn logic circuit 92 feeds into the turn driver circuit 94, and the straight logic circuit 93 feeds into the straight driver circuit 95. The pulse generator circuit 91 feeds into both of the turn and straight logic circuits 92 and 93.

The operation of the output stage 9 depends upon whether it receives a low logic signal from the turn signal demodulation stage 7 or from the straight signal demodulation stage 8. Simply stated, when a low logic signal is received from the turn signal demodulation stage 7, the output stage 9 outputs an intermediate turn command signal from the turn driver circuit 94. Likewise, when a low logic signal is received from the straight signal demodulation stage 8, the output stage 9 outputs an intermediate straight command signal from the straight driver circuit 95. Each of these intermediate command signals takes the form of a pulse of adjustable duration.

Regarding the logic circuitry, the NAND gate 90A of the input logic circuit 90 outputs a high logic signal if either of the logic signals received from the turn signal or straight signal demodulation stages 7 and 8 is low. This inverted logic signal passes to the pulse generator circuit 91 which in response generates the high level pulse of adjustable duration. The logic of the turn and straight logic circuits 92 and 93 assures that if a low logic signal is received from either of the demodulation stages and a pulse is simultaneously received from the pulse generator circuit 91, then the pulse signal passes through one of the inverters 96 or 97 so that a positive going pulse passes to the corresponding one of the turn or straight driver circuits 94 and 95.

Referring in more detail to the operation of the output stage 9 in response to a valid frequency modulated turn signal, the turn signal demodulation stage 7 outputs a low logic signal to the input logic circuit 90, i.e., NAND gate 90A, of the output stage 9. When the low logic signal is received, the input logic circuit 90 processes it through to the pulse generator circuit 91 and to both of the turn and straight logic circuits 92 and 93. The pulse generator circuit 91 then activates for an adjustable duration to produce the pulse, which is also fed into the turn and straight logic circuits 92 and 93.

The adjustable duration for which the pulse generator circuit 91 activates depends on the values of capacitor C25 and resistor R46 as is apparent from FIG. 2F. Preferably, the duration is preset at 500 ms.

The pulse generator circuit 91 also serves as a time out circuit that assures that a frog solenoid will not be energized continuously in the event that an incoming signal is continuously received from a trolley vehicle transmitter. As is apparent, the pulse generator circuit 91 will issue just one pulse of adjustable duration each time a valid incoming signal is received by signal processing unit 2. Through its RC time constant, the pulse generator circuit 91 cannot generate another pulse until the incoming signal has ceased and the time set by the RC time constant has expired.

As is also apparent from FIG. 2F, the turn and straight logic circuits 92 and 93 of output stage 9 are configured so as to form a lock out circuit which permits only one of the driver circuits to operate at any given time. Specifically, the output of NAND gate 92A of the turn logic circuit 92 feeds back into the input of NAND gate 93A of the straight logic circuit 93 and vice versa. Consequently, when the turn logic circuit 92 activates the straight logic circuit 93 is disabled. Conversely, when the straight logic circuit 93 activates the turn logic circuit 92 is disabled.

Returning to the operation of the output stage 9 in response to a valid frequency modulated turn signal, the turn logic circuit 92 receives both the low logic signal through inverter 96 from the turn signal demodulation stage 7 and the pulse of adjustable duration from the pulse generator circuit 91. The NAND gate 92A of the turn logic circuit 92 activates in response to these two inputs for the adjustable duration thereby disabling the straight logic circuit 93 through the lock out circuit. Through inverter 98, the turn logic circuit 92 then passes a positive going pulse of adjustable duration to the turn driver circuit 94. When the positive going pulse arrives at the turn driver circuit 94, the turn driver circuit 94 energizes thereby providing a return circuit for driver transistors Q1 and Q2 of the turn driver circuit 94.

Whether the turn signal demodulation stage is set through SW1 to recognize right turn signals or left turn signals, the operation of the output stage remains the same.

Referring in more detail to the operation of the output stage 9 in response to a valid frequency modulated straight signal, the straight signal demodulation stage 8 outputs a low logic signal to the NAND gate 93A of the input logic circuit 90 of the output stage 9. When the low logic signal is received, the input logic circuit 90 processes it through to the pulse generator circuit 91 and to both of the turn and straight logic circuits 92 and 93. The pulse generator circuit 91 then activates for the adjustable duration as set forth previously to produce the pulse which passes to the turn and straight logic circuits 92 and 93.

Analogous to the operation of the turn logic circuit 92, the straight logic circuit 93 thus receives both the low logic signal through inverter 97 from the straight signal demodulation stage 8 and the pulse of adjustable duration from the pulse generator circuit 91. The NAND gate 93A of the straight logic circuit 93 activates in response to these two inputs for the adjustable duration thereby disabling the turn logic circuit 92 through the lock out circuit. Through inverter 99, the straight logic circuit 93 then passes a positive going pulse of adjustable duration to the straight driver circuit 95. When the positive going pulse arrives at the straight driver circuit 95, the straight driver circuit 95 energizes thereby providing a return circuit for driver transistors Q3 and Q4 of the straight driver circuit 95.

In this presently preferred embodiment of the instant electronic trolley pole switch controller 1, the signal processing unit 2 and the power controlling unit 3 are employed in tandem to control the frog solenoids of a trolley pole switch as noted above. The power controlling unit 3 continuously supplies a primary voltage level, i.e., a 12 volt dc reference voltage, to the collectors of driver transistors Q1 and Q2 of the turn driver circuit 94. The power controlling unit 3 likewise supplies a 12 volt dc reference voltage to the collectors of driver transistors Q3 and Q4 of the straight driver circuit 95.

When the signal processing unit 2 receives a valid frequency modulated straight signal, the straight signal demodulation stage 8 passes a low logic signal to the output stage 9 as described earlier. After the low logic signal is processed through the input logic circuit 90 and the pulse generator circuit 91 as previously described, the straight logic circuit 93 of the output stage then passes the positive going pulse to the straight driver circuit 95. When the positive going pulse arrives at the straight driver circuit 95, the straight driver circuit 95 energizes thereby providing a return circuit for driver transistors Q3 and Q4. The straight driver circuit 95 therethrough passes a negative going 12 volt dc pulse to the corresponding input of the power controlling unit 3. It is through this negative pulse, otherwise referred to as the intermediate straight command signal herein, that the signal processing unit 2 commands the power controlling unit 3 to supply power to the straight solenoid of the trolley pole switch.

Likewise, when the signal processing unit 2 receives a valid frequency modulated turn signal, the turn signal demodulation stage 7 passes a low logic signal to the output stage 9. After the low logic signal is processed through the input logic circuit 90 and the pulse generator circuit 91 as previously described, the turn logic circuit 92 of the output stage 93 then passes the positive going pulse to the turn driver circuit 94. When the positive going pulse arrives at the turn driver circuit 94, the turn driver circuit 94 energizes thereby providing a return circuit for driver transistors Q1 and Q2. The turn driver circuit 94 therethrough passes a negative going 12 volt dc pulse to the corresponding input of the power controlling unit 3. It is through this negative pulse, otherwise referred to as the intermediate turn command signal herein, that the signal processing unit 2 commands the power controlling unit 3 to supply power to turn solenoid of the trolley pole switch.

Referring now to FIG. 3A-H, power controlling unit 3 of the presently preferred embodiment of the instant invention includes a first reduction means 110, a second reduction means 120, a third reduction means 130, a chopper control means 140, a turn output means 150 and a straight output means 170. The power controlling unit 3 of the instant invention is a switching type power supply that regulates its output with transistor switches rather than linear devices common to linear power supplies.

The voltage potential present on a trolley line may fluctuate from approximately 450 to 770 volts dc, though typically it averages about 600 volts dc. The first reduction means 110 reduces this voltage to an initial voltage level of approximately 115 volts dc.

Figure 3C:
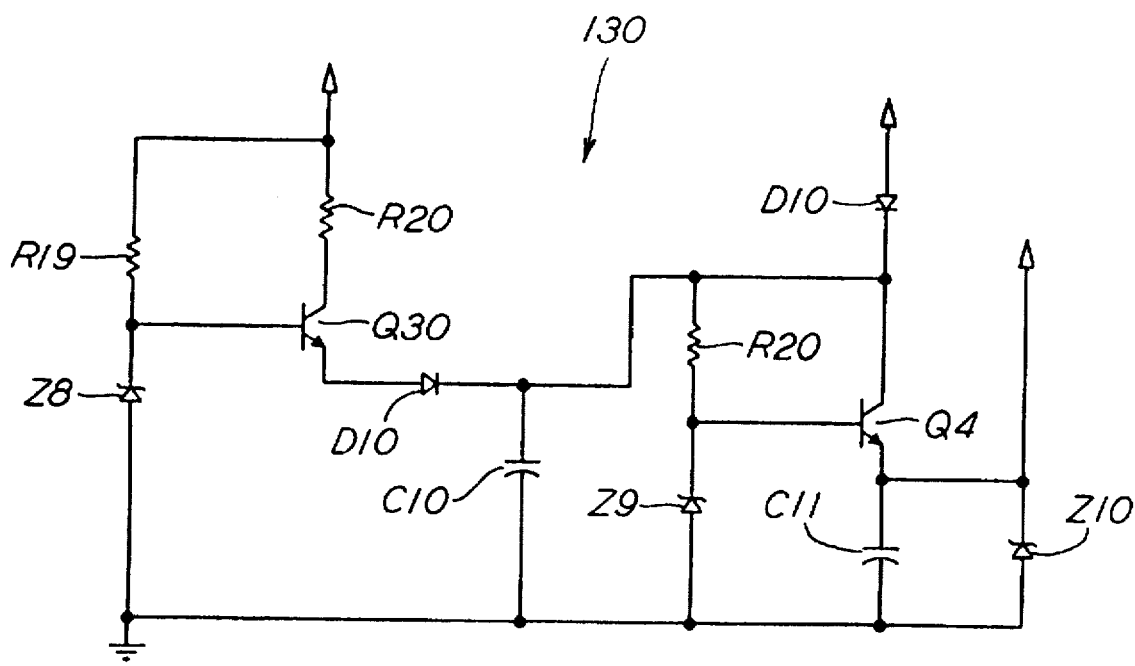
FIG. 3C is a schematic of a third reduction stage of the power controlling unit according to the present invention.
Figure 3A:
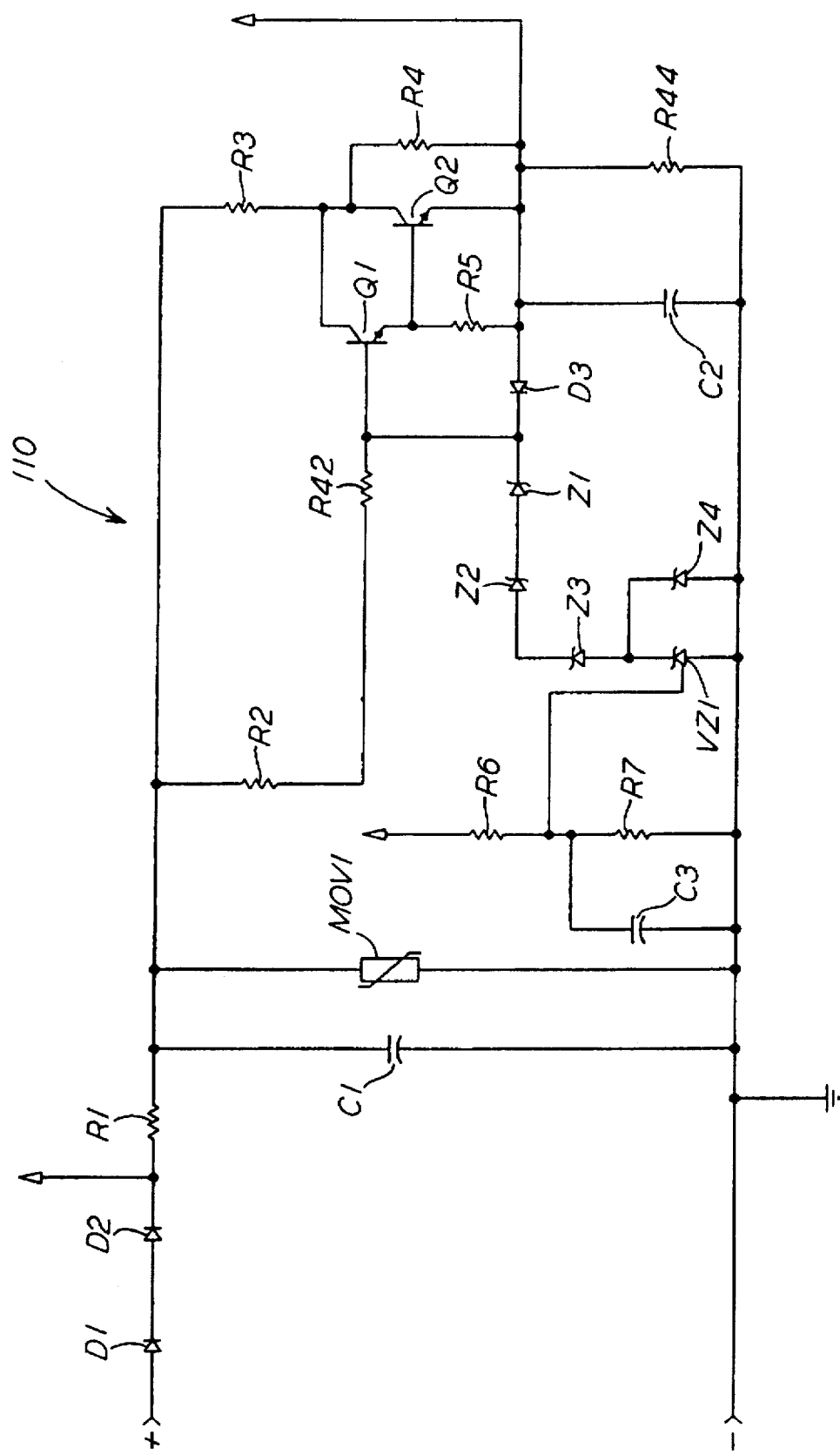
FIG. 3A is a schematic of a first reduction stage of the power controlling unit according to the present invention.

Illustrated in FIG. 3A, the first reduction means 110, whose configuration is well known in the electrical arts, includes, among other commonly used components, resistors R1 through R4 and transistors Q1 and Q2. Connected in series with resistor R1 between the trolley line and the collectors of transistors Q1 and Q2, resistor R3 provides a small part of the voltage reduction of the first reduction means 110. Compared to the prior art power control board, what little energy is lost in the power controlling unit 3 mostly dissipates through resistor R3 which preferably is mounted onto a heat sink.

The first reduction means, or stage 110, also includes overvoltage protection circuitry. The overvoltage protection circuitry for the first reduction stage 110 preferably takes the form of a metal oxide varistor MOV1. Connected in parallel with the first reduction stage 110 between the trolley line and ground as shown in FIG. 3A, MOV1 protects the first reduction stage 110 from surge voltages that may arise on the trolley line.

Controlled by the chopper control stage 140 as described below, the second reduction stage 120 reduces the initial voltage level received from the first reduction stage 110 to a secondary voltage level of approximately 24 volts dc. This 24 volts dc source of power is intended for use by the signal processsing unit 3 so that it receives the necessary power to perform its operations.

Figure 3B:
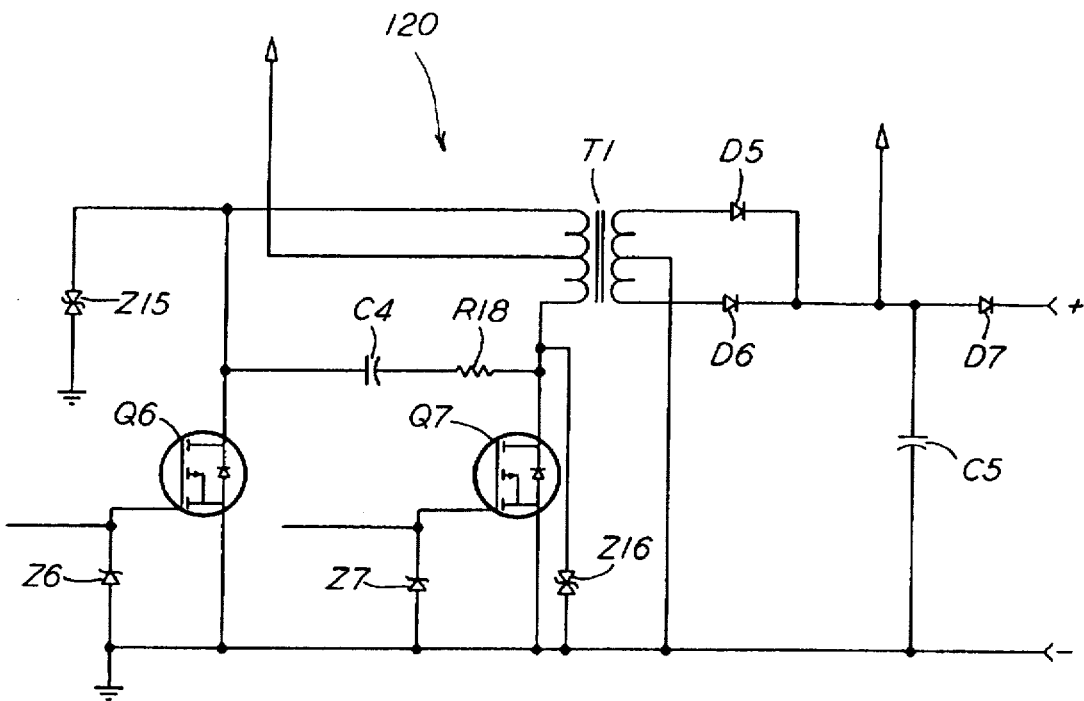
FIG. 3B is a schematic of a second reduction stage of the power controlling unit according to the present invention.

The second reduction stage 120 includes a step down transformer T1, two MOS field effect transistors Q6 and Q7, two rectifier diodes D5 and D6 and a filtering capacitor C5 as shown in FIG. 3B. The step down transformer T1 may be selected from a variety of such devices typically used in such switching power supplies. The center tap of the primary winding of transformer T1 connects to the initial voltage level of 115 volts dc received from the first reduction stage 110. MOSFET Q6 connects between one of the outer leads of the primary winding of transformer T1 and ground. MOSFET Q7 connects between the other of the outer leads of the primary winding of transformer T1 and ground. Each rectifier diode D5 and D6 connects to one of the outer leads of the secondary winding of transformer T1. The center tap of the secondary winding of transformer T1 connects to ground.

MOSFET Q6 switches on each time a high logic signal is received on buffer chopper line A from the chopper control stage 140 as described below Likewise, MOSFET Q7 switches on each time a high logic signal is received on buffer chopper line B. The rate at which MOSFETs Q6 and Q7 alternately switch on and off depends upon the configuration of the chopper control stage 140. As is well known by practitioners skilled in the electrical arts, by alternately switching the direction of current flow through the primary winding of transformer T1, current flow is induced in the secondary winding through magnetic induction. With the power level reduced via the turns ratio of the step down transformer T1, rectifier diodes D5 and D6 then rectify the positive and negative components of this ac signal to the secondary voltage level of 24 volts dc. The capacitor C5 filters the rectified signal to provide the secondary voltage level intended for signal processing unit 2.

The second reduction stage 120 also includes transient protection circuitry which preferably takes the form of bidirectional Zener diodes Z15 and Z16. Each diode connects in series between ground and one of the outer leads of the primary winding of transformer T1 as shown in FIG. 3B. Diodes Z15 and Z16 protect the power controlling unit from various adverse electrical influences including the inductive kick of transformer T1 over a range of temperatures.

The third reduction stage 130, as shown in FIG. 3C, reduces the secondary voltage level of 24 3volts dc received from the second reduction stage 120 to a primary voltage level of approximately 12 volts dc. The third reduction stage 130 converts the secondary voltage level to 12 volts dc as long as the initial voltage level of 115 volts dc is received from the first reduction stage 110. This primary voltage level is made available to supply the power controlling unit 3 with the necessary power to perform its operations.

Though each of the reduction stages 110, 120 and 130 described herein are commonly practiced in the electronic arts, it is their interaction together and their use with the turn output and straight output stages that sets the instant power controlling unit 3 apart from the prior art power supply board. Moreover, compared to approximately 60 watts dissipated by prior art power control boards, the power controlling unit 3 dissipates merely 2 watts of heat in reducing the trolley line voltage to the voltage levels set forth herein.

Figure 3D:
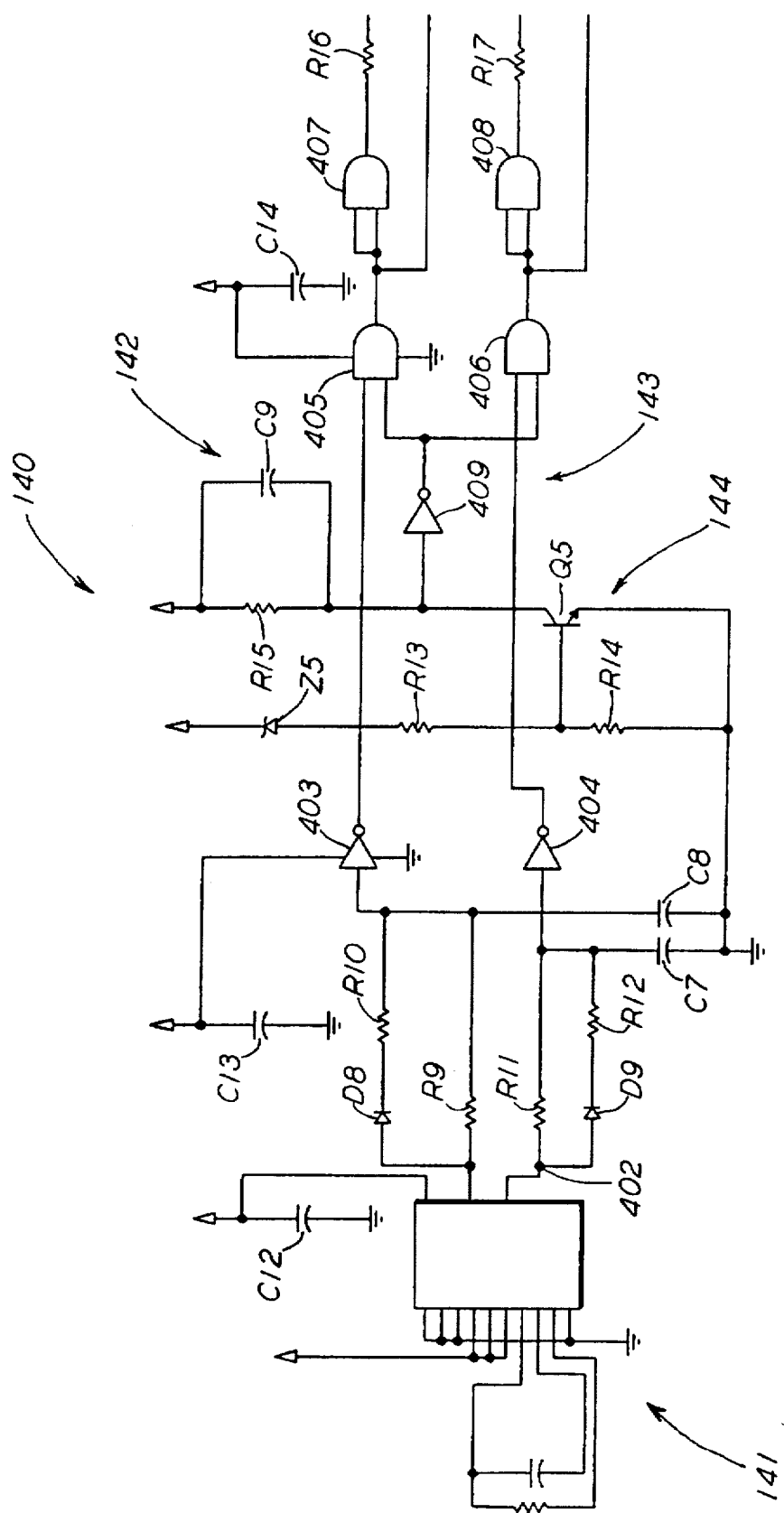
FIG. 3D is a schematic of a chopper control stage of the power controlling unit according to the present invention.

The chopper control stage 140 includes a multivibrator or like oscillator circuit 141, a first logic circuit 142, a second logic circuit 143 and a shut down circuit 144 as illustrated in FIG. 3D. The multivibrator circuit 141 includes a resistor R8, a capacitor C6, a first output 401 that connects to the first logic circuit 142, a second output 402 that connects to the second logic circuit 143. Preferably operating at a fifty percent duty cycle, the multivibrator circuit 141 generates high and low logic signals from each of its outputs on an alternating basis. Forming the time constant of a resistance-capacitance circuit, the values of resistor R8 and capacitor C6 determine the preset rate at which the logic signals are alternately dispatched from the outputs of multivibrator circuit 141.

The first logic circuit 142 includes an inverter 403, a first AND gate 405 and a second AND gate 407. Likewise, the second logic circuit 143 includes an inverter 404, a first AND gate 406 and a second AND gate 408. The shut down circuit 144 includes a transistor Q5, resistors R13 and R14, and an inverter 409. Resistors R13 and R14 serve to forward bias, i.e., activate, transistor Q5 as long as the first reduction stage 110 supplies the initial voltage level of 115 volts dc to the shut down circuit 144 as shown in FIG. 3D. Transistor Q5, when activated, passes a low logic signal to the input of inverter 409. Inverter 409 then passes a high logic signal to each of the first AND gates 405 and 407 of the first and second logic circuits 142 and 143, respectively, as long as the first reduction stage 110 supplies the initial voltage level to the shut down circuit 144. The shut down circuit 144 thus disables the chopper control stage 140 when the first reduction stage 110 ceases supplying the initial power level to the shut down circuit 144.

Regarding the operation of the chopper control stage 140, the chopper control stage 140 outputs a first pair of alternating logic signals on buffer chopper lines A and B and a second pair of alternating logic signals on chopper lines A and B. When the multivibrator circuit 141 outputs a high logic signal from its first output 401, the first logic circuit 142 passes a low logic signal on the both the buffer chopper A and chopper A lines. Specifically, inverter 403 inverts the high logic signal received from the first output 401 of the multivibrator circuit 141 thereby passing a low logic signal to the first AND gate 405. Having a low logic signal at one input from inverter 403 and a high logic signal at the other input from the inverter 409 of the shut down circuit 144, AND gate 405 passes a low logic signal on the chopper line A to the turn output and the straight output stages 150 and 170, described below. AND gate 407, having a low logic signal at each of its inputs, then passes a low logic signal on the buffer chopper A line to MOSFET Q6 of the second reduction stage 120 previously described.

While multivibrator circuit 141 outputs the high logic signal from its first output 401, it simultaneously outputs a low logic signal from its second output 402. In response, the second logic circuit 143 passes a high logic signal on the both the buffer chopper B and chopper B lines. Specifically, inverter 404 inverts the low logic signal received from the second output 402 of the multivibrator circuit 141 thereby passing a high logic signal to the second AND gate 406. Having a high logic signal at one input from inverter 404 and a high logic signal at the other input form the inverter 409 of the shut down circuit 144, AND gate 406 passes a high logic signal on the chopper line B to the turn output and the straight output stages 150 and 170, described below. Meanwhile, AND gate 408, having a high logic signal at each of its inputs, passes a high logic signal on buffer chopper line B to MOSFET Q7 of the second reduction stage 120 previously described. It is apparent that AND gate 407 provides a level of buffering between buffer chopper line A and chopper line A as does AND gate 408 between buffer chopper line B and chopper line B.

Multivibrator circuit 141, alternately switching its outputs at the preset rate, then simultaneously outputs a low logic signal from its first output 401 and a high logic signal from its second output 402. The first logic circuit 142 then passes both a high logic signal on buffer chopper line A to MOSFET Q6 of the second reduction stage 120 and a high logic signal on chopper line A to the turn output and the straight output stages 150 and 170. Simultaneously, the second logic circuit 143 then passes both a low logic signal on buffer chopper line B to MOSFET Q7 of the second reduction stage 120 and a low logic signal on chopper line B to the turn output and the straight output stages 150 and 170.

Simply stated, through the first pair of alternating logic signals, the chopper control stage 140 drives the MOS field effect transistors Q6 and Q7, respectively, of the second reduction stage 120. Meanwhile, through the second pair of alternating logic signals, the chopper control stage 140 assists in driving the turn output and straight output stages 150 and 170.

Figure 3E:
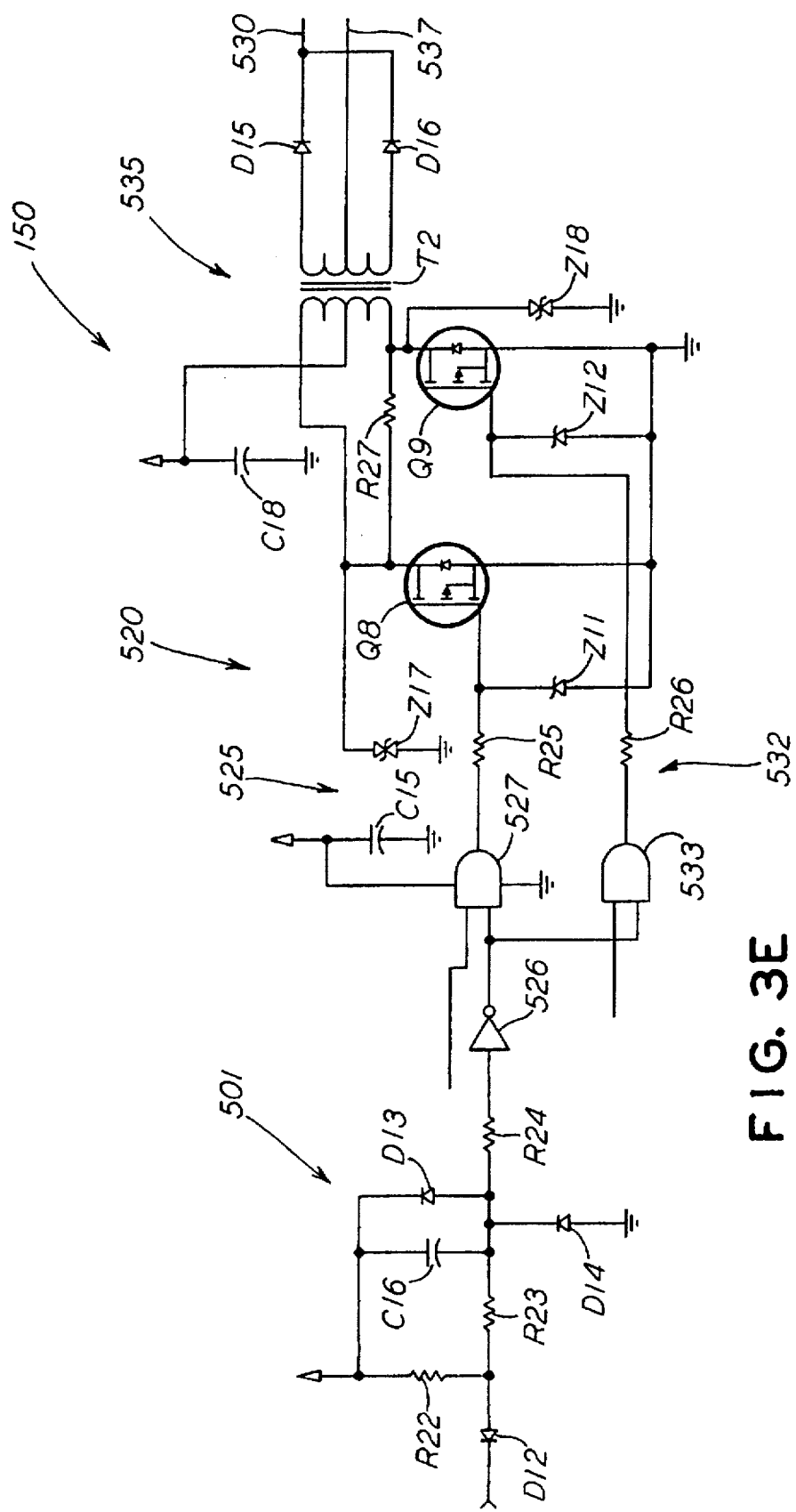
FIGS. 3E and F is a schematic of a turn output stage of the power controlling unit according to the present invention.
Figure 3F:
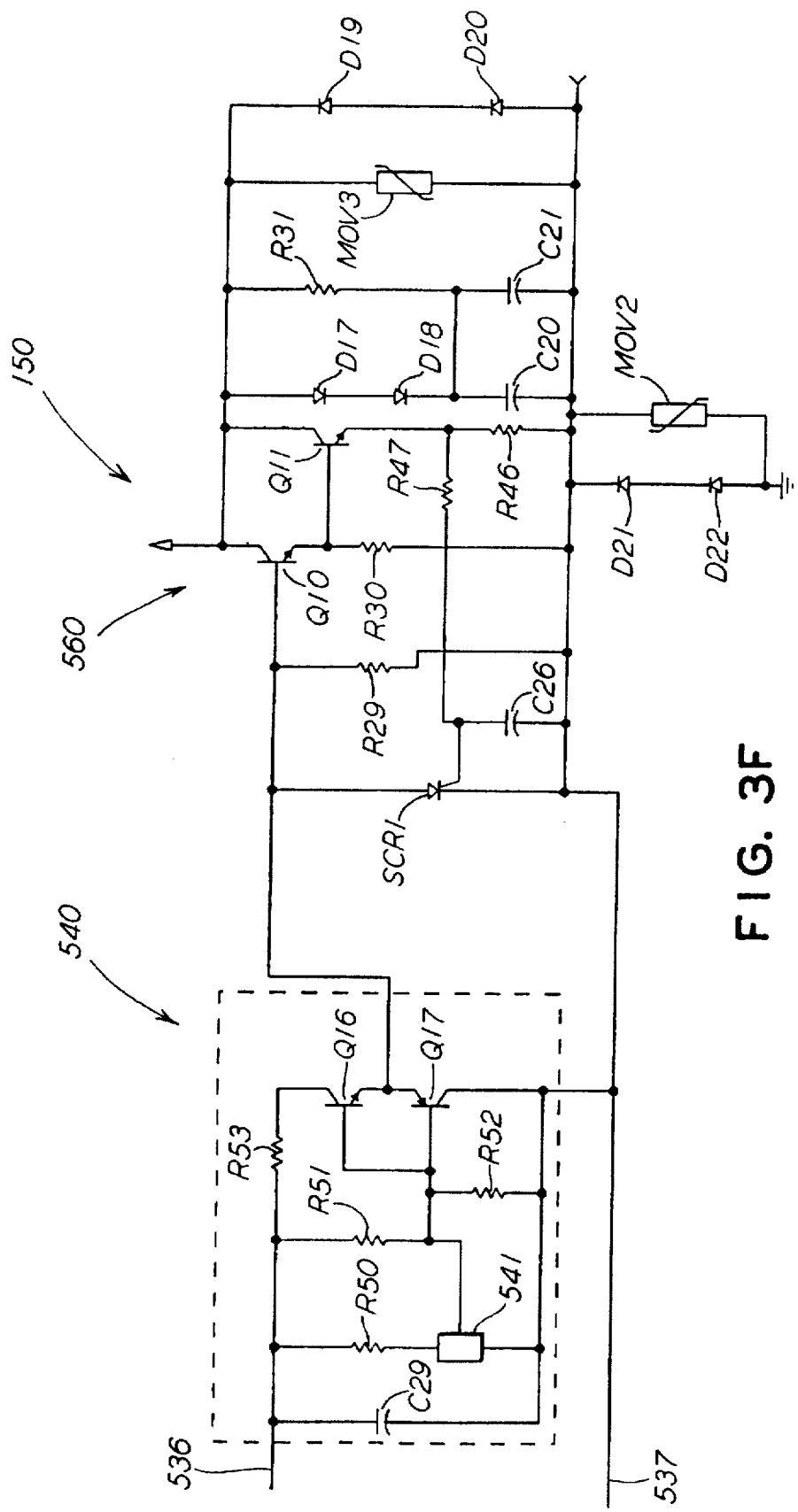
FIGS. 3G and H is a schematic of a straight output stage of the power controlling unit according to the present invention.

Referring to FIG. 3E-F, the turn output stage 150 includes a turn input circuit 501, a turn chopper circuit 520, a step down transformer circuit 535, a turn output control circuit 540 and a turn solenoid driver circuit 560. Referring specifically to FIG. 3E, the turn input circuit 501 includes resistors R22 and R23, a capacitor C16 and diodes D12, D13 and D14. Supplied with the primary voltage level from the third reduction stage 130, resistor R22 serves as a pull up resistor through which 12 volts dc is supplied via diode D12 to the turn driver circuit 94 of the signal processing unit 2. It is the turn input circuit 501 to which the turn driver circuit 94 passes the negative going pulse, i.e., the intermediate turn command signal, as described previously. Resistor R22 provides the impedance against which the turn driver circuit 94 pulls low via the intermediate turn command signal. Resistor R23 and capacitor C16 provide filtering for the turn input circuit 501. Diodes D13 and D14 protect the turn output stage 150 from excessively high and low variations, respectively, in power level arriving at the input of the turn input circuit 501.

The turn chopper circuit 520 and the transformer T2 essentially provide a power supply which drives both the turn output control circuit 540 and the turn solenoid driver circuit 560. The turn chopper circuit 520 includes a first control circuit 525 and a second control circuit 532. The first control circuit 525 includes an inverter 526, an AND gate 527 and a MOSFET Q8, and the second control circuit 532 includes the inverter 5215, an AND gate 533 and a MOSFET Q9. One of the outer leads of the primary winding of the transformer T2 connects to MOSFET Q8 whereas the other outer lead connects to MOSFET Q9. The center tap connects to the initial voltage level of 115 volts dc from the first reduction stage 110. Each outer lead of the secondary winding connects via one of two rectifier diodes D15 and D16 to a turn control line 536. The center tap of the secondary winding connects to a turn out line 537. The turn chopper circuit 520 functions much the same way as the combination of the chopper control stage 140 and the second reduction stage 120 described previously.

Regarding the operation of the turn chopper circuit 520, the chopper control stage 140 through the second pair of alternating logic signals and the signal processing unit 2 through the intermediate turn command signal control the operation of the turn chopper circuit 520. In response to these inputs, the turn chopper circuit 520 outputs a third pair of alternating logic signals that controls the operation of the transformer circuit 535. Specifically, when the turn input circuit 501 receives the intermediate turn command signal, i.e., negative going pulse, from the signal processing unit 2, inverter 526 passes a high logic signal to one input of both AND gate 527 and AND gate 533. When the chopper control stage 140 outputs a high logic signal on chopper line A to the other input of AND gate 527, AND gate 527 passes a high logic signal thereby switching on MOSFET Q8 to provide a low impedance path to ground for one end of the primary winding of transformer T2. Simultaneously, chopper control stage 140 outputs a low logic signal on chopper line B to the other input of AND gate 533. AND gate 533 then passes a low logic signal thereby switching off MOSFET Q9 to provide an open circuit for the other end of the primary winding of transformer T2. Rectifier diode D15 then rectifies the resulting ac signal on the turn control line 536.

The chopper control stage 140, alternately switching its outputs at the preset rate, then simultaneously outputs a low logic signal on the chopper line A and a high logic signal on the chopper line B. When an intermediate turn command signal appears at the turn input circuit 501, AND gate 527 passes a low logic signal thereby switching off MOSFET Q8 to provide an open circuit for the other end of the primary winding of transformer T2. Simultaneously, AND gate 533 passes a high logic signal thereby switching on MOSFET Q9 to provide a low impedance path to ground for the one end of the primary winding of transformer T2. Rectifier diode D16 then rectifies the resulting ac signal induced in the secondary winding and passes the rectified signal on the turn control line 536.

From the foregoing, it is apparent that the voltage level present on the turn control line 536 (hereinafter "turn control voltage") of the turn chopper circuit 520 is approximately equal to that on the turn out line 537 (hereinafter "turn out voltage") as long as no intermediate turn command signal appears at the input to the turn output stage 150. When an intermediate turn command signal does appear, however, it is equally apparent that the turn control voltage will be a predetermined amount higher than the turn out voltage. The relative voltages levels carried by the turn control and turn out lines 536 and 537 control the operation of the remainder of the turn output stage 150 as described below.

Referring now to FIG. 3F, the turn output control circuit 540 of the turn output stage 150 includes transistors Q16 and Q17 and a voltage monitor 541. The turn solenoid driver circuit 560 includes driver transistors Q10 and Q11.

Regarding the operation of the turn output control circuit 540 as it controls the turn solenoid driver circuit 560, voltage monitor 541 senses via input pins 1 and 3 when the turn control voltage is the predetermined amount higher than the turn out voltage. Simply stated, when the turn control voltage is higher than the turn out voltage, voltage monitor 541 open circuits output pin 2 thereby activating transistor Q16. This activates driver transistors Q10 and Q11 of the turn solenoid driver circuit 560 thereby switching the high voltage of the trolley line to the turn solenoid of the trolley pole switch. When so energized, the turn solenoid acts to switch the path of travel that the energy collector assembly will take through the trolley pole switch to the turn power conduit.

Conversely, when the turn control voltage is generally equal to or lower than the predetermined voltage difference, voltage monitor 541 provides a low impedance path from output pin 2 to a common with the turn out line 537 thereby activating transistor Q17. This passes the turn out voltage to the turn solenoid driver circuit 560 which is insufficient to activate driver transistors Q10 and Q11. Trolley line voltage then does not pass to the turn solenoid of the trolley pole switch.

Though it is apparent that the turn output stage 150 could be configured to operate without the turn output control circuit 540, the turn output control circuit 540 assures that the driver transistors Q10 and Q11 of the turn solenoid driver circuit 560 will respond quickly enough over a wide range of temperatures.

Referring still to FIG. 3F, sheet 6 the turn solenoid driver circuit 560 of the turn output stage 150 also includes overcurrent protection circuitry, a snubber circuit and overvoltage protection circuitry. The overcurrent protection circuitry includes resistors R46 and R47, capacitor C26 and a silicon controlled rectifier SCR1. When the voltage at the gate of the SCR1 rises above a preset threshold inherent to SCR1 then SCR1 conducts. When SCR1 conducts, SCR1 presents the turn out voltage to the base of driver transistor Q10 thereby deactivating and therein protecting driver transistors Q10 and Q11 from excessive current. Resistor R46 senses the current flowing from driver transistor Q11. Filtered through resistor R47 and capacitor C26, the excessive current enables SCR1 to conduct. When the voltage across the anode and cathode of SCR1 equalizes, SCR1 no longer conducts and the turn solenoid driver circuit 560 is again ready to operate under the control of the turn output control circuit 540.

The snubber circuit includes resistor R31, capacitors C20 and C27, and diodes D17 and D18. Taken together these components protect the driver transistors Q10 and Q11 from the destructive effects of second breakdown, a phenomenon associated with the excessive loading of bipolar transistors. The turn solenoid driver circuit 560 also includes freewheeling diodes D21 and D22. The turn solenoid as an inductive device temporarily stores energy when energized by the high voltage of the trolley line via the turn solenoid driver circuit 560. When the turn solenoid deenergizes, the residual energy if allowed to flow back uninhibited into the turn solenoid driver circuit 560 might damage driver transistors Q10 and Q11. Diodes D21 and D22 protect these semiconductor switching elements from the discharge of excessive energy, i.e., inductive kickback, from the turn solenoid of the trolley pole switch.

The overvoltage protection circuitry preferably may take the form of metal oxide varistors MOV2 and MOV3. Connected across the output of the turn solenoid driver circuit 560 as shown in FIG. 3F, MOV3 protects driver transistors Q10 and Q11 from surge voltages that may arise on the trolley line. Connected across the freewheeling diodes D21 and D22, MOV2 likewise protects them from surge voltages.

Figure 3G:
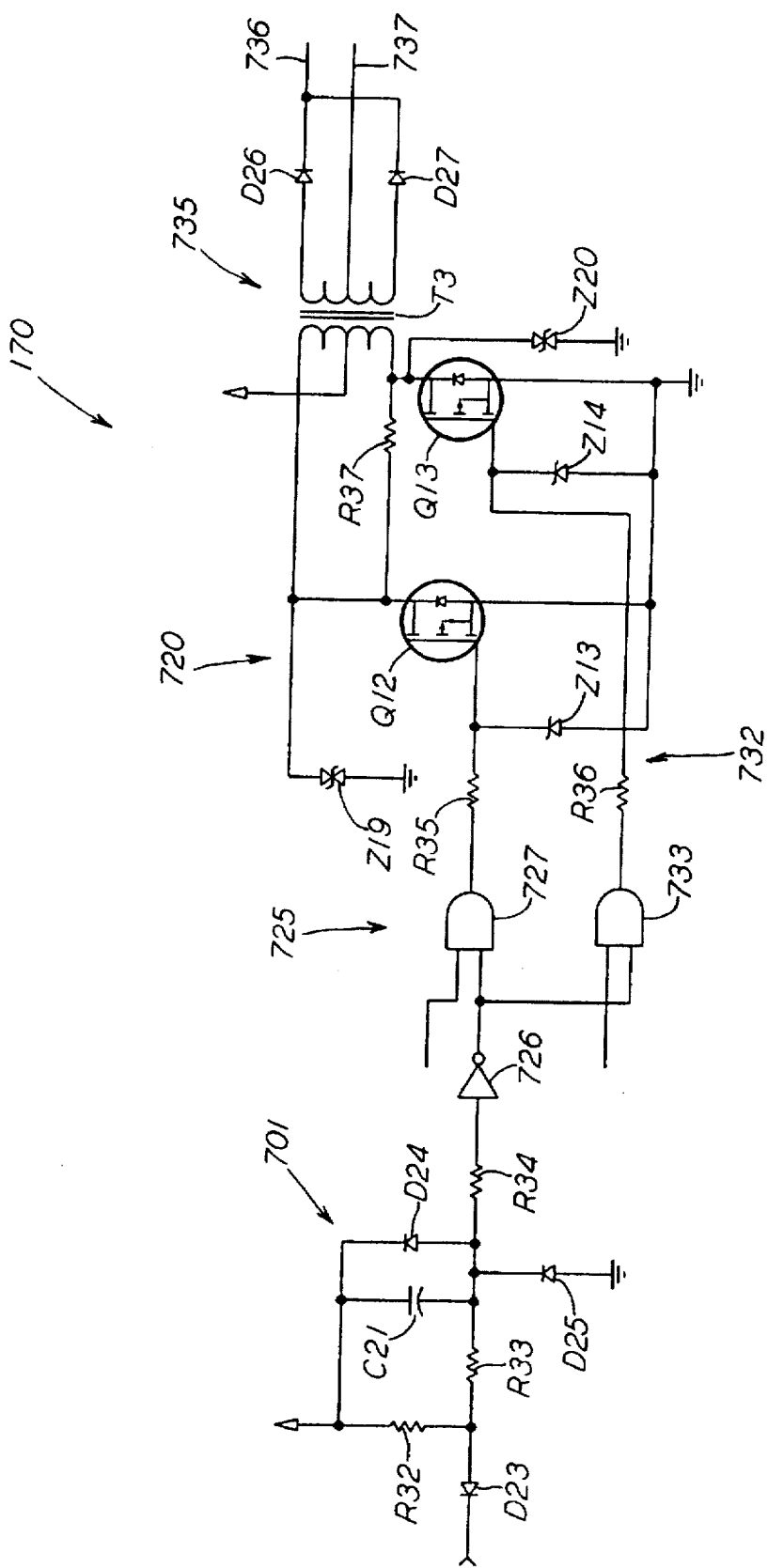
Figure 3H:
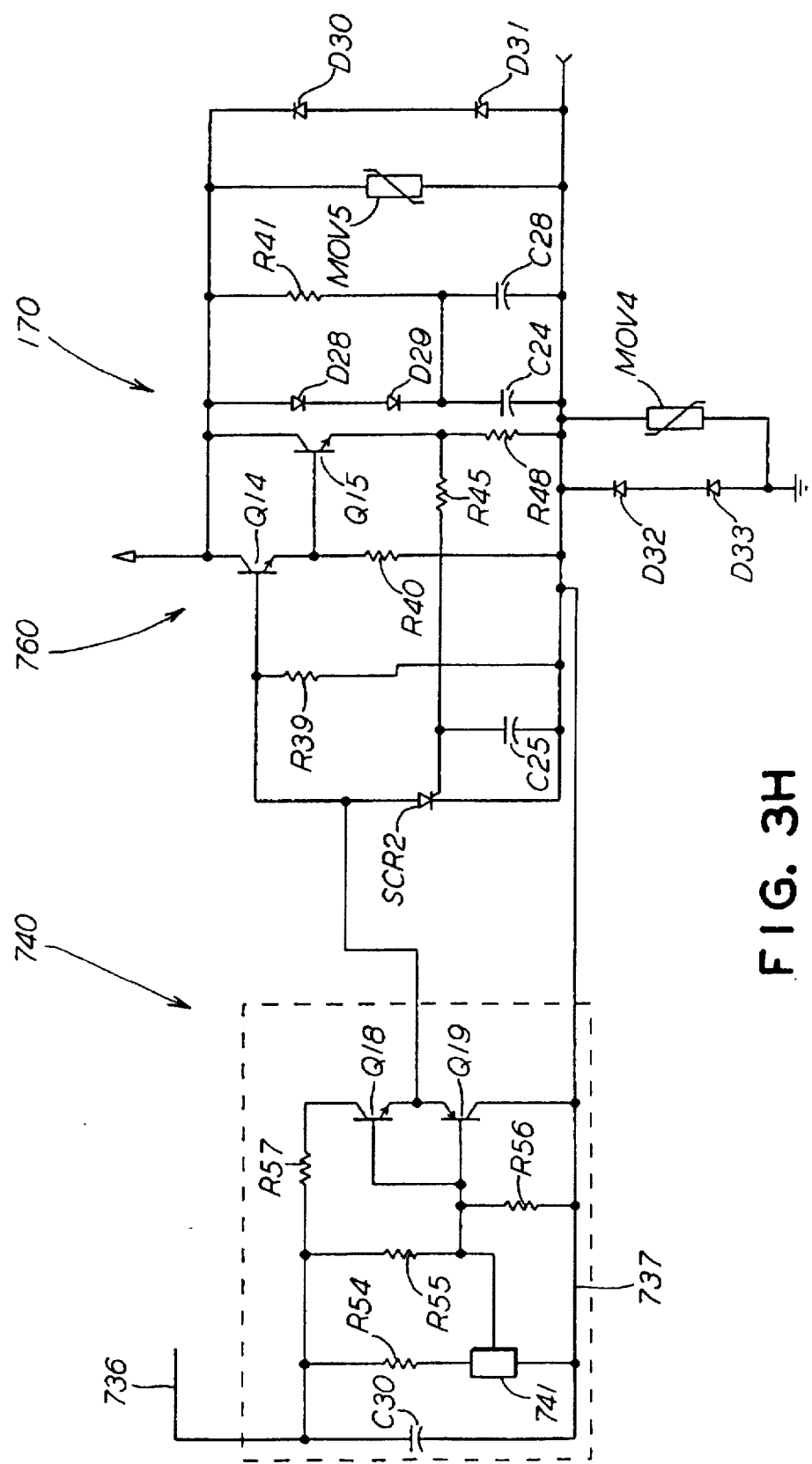

Referring to FIGS. 3G–H, the straight output stage 170 includes a straight input circuit 701, a straight chopper circuit 720, a step down transformer circuit 735, a straight output control circuit 740 and a straight solenoid driver circuit 760. Referring specifically to FIG. 3G the straight input circuit 701 includes resistors R32 and R33, a capacitor C21 and diodes D23, D24 and D25. Supplied with the primary voltage level from the third reduction stage 130, resistor R32 serves as a pull up resistor through which 12 volts dc is supplied via diode D23 to the straight driver circuit 95 of the signal processing unit 2. It is the straight input circuit 701 to which the straight driver circuit 95 passes the negative going pulse, i.e., the intermediate straight command signal, as described previously. Resistor R32 provides the impedance against which the straight driver circuit 95 pulls low via the intermediate straight command hand signal. Resistor R33 and capacitor C21 provide filtering for the straight input circuit 701. Diodes D24 and D25 protect the straight output stage 170 from excessively high and low variations, respectively, in power level arriving at the input of the straight input circuit 701.

The straight chopper circuit 720 and the transformer T3 essentially provide a power supply which drives both the straight output control circuit 740 and the straight solenoid driver circuit 760. The straight chopper circuit 720 includes a first control circuit 725 and a second control circuit 732. The first control circuit 725 includes an inverter 726, an AND gate 727 and a MOSFET Q12, and the second control circuit 732 includes the inverter 726, an AND gate 733 and a MOSFET Q13. One of the outer leads of the primary winding of the transformer T3 connects to MOSFET Q12 whereas the other outer lead connects to MOSFET Q13. The center tap connects to the initial voltage level of 115 volts dc from the first reduction stage 110. Each outer lead of the secondary winding connects via one of two rectifier diodes D26 and D27 to a straight control line 736. The center tap of the secondary winding connects to a straight out line 737. The straight chopper circuit 720 functions much the same way as the combination of the chopper control stage 140 and the second reduction stage 120 described previously.

Regarding the operation of the straight chopper circuit 720, the chopper control stage 140 through the second pair of alternating logic signals and the signal processing unit 2 through the intermediate straight command signal control the operation of the straight chopper circuit 720. In response to these inputs, the straight chopper circuit 720 outputs a fourth pair of alternating logic signals that controls the operation of the transformer circuit 735. Specifically, when the straight input circuit 701 receives the intermediate straight command signal, i.e., negative going pulse, from the signal processing unit 2, inverter 726 passes a high logic signal to one input of both AND gate 727 and AND gate 733. When the chopper control stage 140 outputs a high logic signal on chopper line A to the other input of AND gate 727, AND gate 727 passes a high logic signal thereby switching on MOSFET Q12 to provide a low impedance path to ground for one end of the primary winding of transformer T3. Simultaneously, chopper control stage 140 outputs a low logic signal on chopper line B to the other input of AND gate 733. AND gate 733 then passes a low logic signal thereby switching off MOSFET Q13 to provide an open circuit for the other end of the primary winding of transformer T3. Rectifier diode D26 then rectifies the resulting ac signal on the straight control line 736.

The chopper control stage 140, alternately switching its outputs at the preset rate, then simultaneously outputs a low logic signal on the chopper line A and a high logic signal on the chopper line B. When an intermediate straight command signal appears at the straight input circuit 701, AND gate 727 passes a low logic signal thereby switching off MOSFET Q12 to provide an open circuit for the other end of the primary winding of transformer T3. Simultaneously, AND gate 733 passes a high logic signal thereby switching on MOSFET Q13 to provide a low impedance path to ground for the one end of the primary winding of transformer T3. Rectifier diode D27 then rectifies the resulting ac signal induced in the secondary winding and passes the rectified signal on the straight control line 736.

From the foregoing, it is apparent that the voltage level present on the straight control line 736 (hereinafter "straight control voltage") of the straight chopper circuit 720 is approximately equal to that on the straight out line 737 (hereinafter "straight out voltage") as long as no intermediate straight command signal appears at the input to the straight output stage 170. When an intermediate straight command signal does appear, however, it is equally apparent that the straight control voltage will be a predetermined amount higher than the straight out voltage. The relative voltages levels carried by the straight control and straight out lines 736 and 737 control the operation of the remainder of the straight output stage 170 as described below.

Referring now to FIG. 3H the straight output control circuit 740 of the straight output stage 170 includes transistors Q14 and Q15 and a voltage monitor 741. The straight solenoid driver circuit 760 includes driver transistors Q18 and Q19.

Regarding the operation of the straight output control circuit 740 as it controls the straight solenoid driver circuit 760, voltage monitor 741 senses via input pins 1 and 3 when the straight control voltage is the predetermined amount higher than the straight out voltage. Simply stated, when the straight control voltage is higher than the straight out voltage, voltage monitor 741 open circuits output pin 2 thereby activating transistor Q18. This activates driver transistors Q14 and Q15 of the straight solenoid driver circuit 760 thereby switching the high voltage of the trolley line to the straight solenoid of the trolley pole switch. When so energized, the straight solenoid acts to switch the path of travel that the energy collector assembly will take through the trolley pole switch to the straight power conduit.

Conversely, when the straight control voltage is generally equal to or lower than the predetermined voltage difference, voltage monitor 741 provides a low impedance path from output pin 2 to the straight out line 737 thereby activating transistor Q19. This passes the straight out voltage to the straight solenoid driver circuit 760 which is insufficient to activate driver transistors Q14 and Q15. Trolley line voltage then does not pass to the straight solenoid of the trolley pole switch.

Though it is apparent that the straight output stage 170 could be configured to operate without the straight output control circuit 740, the straight output control circuit 740 assures that the driver transistors Q14 and Q15 of the straight solenoid driver circuit 760 will respond quickly enough over a wide range of temperatures.

Referring still to FIG. 3H the straight solenoid driver circuit 760 of the straight output stage 170 also includes overcurrent protection circuitry, a snubber circuit and overvoltage protection circuitry. The overcurrent protection circuitry includes resistors R48 and R45, capacitor C25 and a silicon controlled rectifier SCR2. When the voltage at the gate of the SCR2 rises above a preset threshold inherent to SCR2 then SCR2 conducts. When SCR2 conducts, SCR2 presents the straight out voltage to the base of driver transistor Q14 thereby deactivating and therein protecting driver transistors Q14 and Q15 from excessive current. Resistor R48 senses the current fling from driver transistor Q15. Filtered through resistor R45 and capacitor C25, the excessive current enables SCR2 to conduct. When the voltage across the anode and cathode of SCR2 equalizes, SCR2 no longer conducts and the straight solenoid driver circuit 760 is again ready to operate under the control of the straight output control circuit 740.

The snubber circuit includes resistor R41, capacitors C24 and C28, and diodes D28 and D29. Taken together these components protect the driver transistors Q14 and Q15 from the destructive effects of second breakdown. The straight solenoid driver circuit 760 also includes freewheeling diodes D32 and D33. Diodes D32 and D33 protect driver transistors Q14 and Q15 from the discharge of excessive energy, i.e., inductive kickback, from the straight solenoid of the trolley pole switch.

The overvoltage protection circuitry preferably may take the form of metal oxide varistors MOV4 and MOV5. Connected across the output of the straight solenoid driver circuit 760 as shown in FIG. 3H MOV5 protects driver transistors Qi and Q15 from surge voltages that may arise on the trolley line. Connected across the freewheeling diodes D32 and D33, MOV4 likewise protects them from surge voltages.

While the presently preferred embodiment and related aspects of the instant invention have been set forth in detail according to the Patent Act, those persons of ordinary skill in the technical art to which this invention pertains will recognize various alternative ways of practicing the invention without departing from the spirit and scope of the appended claims. Those of ordinary skill will also recognize that the foregoing description is merely illustrative and is not intended to limit the invention in any way.

Accordingly, to promote the progress of science and useful arts, we secure for ourselves by Letters Patent exclusive rights to all subject matter embraced by the following claims for the time prescribed by the Patent Act.

We claim:

1. An electronic controller for controlling a trolley pole switch, such trolley pole switch having at least one frog for switching the path of travel therethrough of an energy collector assembly of a trolley pole at a junction of power conduits at which a turn power conduit and a straight power conduit diverge from such straight power conduit, said electronic trolley pole switch controller comprising:

(a) a signal processing means for detecting and processing a modulated turn signal indicative of a request to switch the path of travel through such at least one frog to such turn power conduit and a modulated straight signal indicative of a request to switch the path of travel through such at least one frog to such straight power conduit, and for generating in response to such modulated turn signal an intermediate turn command signal indicative of a command to supply power to one electrical operator of such at least one frog for effecting the switch in the path of travel through such at least one frog to such turn power conduit and in response to such modulated straight signal an intermediate straight command signal indicative of a command to supply power to another electrical operator of such at least one frog for effecting the switch in the path of travel through such at least one frog to such straight power conduit; and (b) a power controlling means for receiving said intermediate command signals from said signal processing means and for supplying in response thereto power to such electrical operator corresponding to said intermediate command signal so received thereby energizing such corresponding electrical operator and therethrough compelling such at least one frog to switch the path of travel that such energy collector assembly will take through such at least one frog to a corresponding one of such power conduits.

2. The electronic controller for controlling a trolley pole switch as recited in claim 1 wherein said signal processing means includes:

(a) an input means for filtering, amplifying and conditioning each such modulated signal so received and generating in response thereto a conditioned modulated signal, said conditioned modulated signal being a conditioned modulated turn signal when generated in response to such modulated turn signal and a conditioned modulated straight signal when generated in response to such modulated straight signal;

(b) a frequency detection means for detecting whether said conditioned modulated signal received from said input means falls within a predetermined band of frequencies and, if so, generating in response to said conditioned modulated signal so received a validation signal indicative of same;

(c) a turn signal demodulation means for receiving said conditioned modulated turn signal from said input means and said validation signal from said frequency detection means such that if said conditioned modulated turn signal and said validation signal are received simultaneously, said turn signal demodulation means demodulates said conditioned modulated turn signal and generates in response thereto a low logic signal;

(d) a straight signal demodulation means for receiving said conditioned modulated straight signal from said input means and said validation signal from said frequency detection means such that if said conditioned modulated straight signal and said validation signal are received simultaneously, said straight signal demodulation means demodulates said conditioned modulated straight signal and generates in response thereto a low logic signal; and (e) an output means for receiving said logic signals from said turn signal and said straight signal demodulation means such that if said low logic signal is received from said turn signal demodulation means said output means generates said intermediate turn command signal and disables itself from generating said intermediate straight command signal and that if said low logic signal is received from said straight signal demodulation means said output means generates said intermediate straight command signal and disables itself from generating said intermediate turn command signal.

3. The electronic controller for controlling a trolley pole switch as recited in claim 2 wherein said input means includes:

(a) a bandpass filter circuit for filtering each such modulated signal so received such that frequencies outside said predetermined band are substantially attenuated and frequencies within said predetermined band are allowed to pass therethrough as a filtered modulated signal indicative of such request;

(b) an isolation circuit, through which said filtered modulated signal passes, for substantially isolating electrically said signal processing means from undesired electrical influences;

(c) a gain adjusting circuit, through which said filtered modulated signal passes from said isolation circuit, for adjusting sensitivity of said input means to such modulated signal so received;

(d) a bandpass amplifier circuit for amplifying said filtered modulated signal received from said gain adjuster circuit such that frequencies within said predetermined band are allowed to pass through said bandpass amplifier with substantially uniform response as an amplified modulated signal; and (e) a first signal shaping circuit, through which said amplified modulated signal passes from said bandpass amplifier circuit, for improving condition of the waveform of said amplified modulated signal so as to form said conditioned modulated signal for further processing by said signal processing means.

4. The electronic controller for controlling a trolley pole switch as recited in claim 3 wherein said frequency detection means includes:

(a) a first phased locked loop circuit for receiving said conditioned modulated signal from said first signal shaping circuit and generating in response thereto a square wave signal whose voltage level is representative of the frequency of said conditioned modulated signal; and (b) a first level comparator circuit for setting upper and lower voltage thresholds and for comparing said voltage level of said square wave signal such that if said voltage level of said square wave signal falls within said voltage thresholds said first level comparator circuit generates said validation signal.

5. The electronic controller for controlling a trolley pole switch as recited in claim 4 wherein said turn signal demodulation means includes:

(a) a second phase lock loop circuit for receiving said conditioned modulated turn signal from said first signal shaping circuit and said validation signal from said first level comparator circuit such that if said conditioned modulated turn signal and said validation signal are received simultaneously, said second phase lock loop circuit demodulates said conditioned modulated turn signal and generates in response thereto a square wave turn signal whose voltage level is representative of the frequency of a modulation turn signal carried by said conditioned modulated turn signal;

(b) a second low pass filter circuit for filtering noise from said square wave turn signal such that frequencies above a first preselected frequency corresponding to such modulation turn signal are substantially attenuated and frequencies below said first preselected frequency are allowed to pass therethrough;

(c) a second signal shaping circuit, through which said square wave turn signal passes from said second low pass filter circuit, for improving condition of the waveform of said square wave turn signal for further processing by said turn signal demodulation means; and (d) a second level comparator circuit for setting a lower voltage threshold and for comparing said voltage level of said square wave turn signal such that if said voltage level of said square wave turn signal lies above said lower voltage threshold said second level comparator circuit generates said low logic signal.

6. The electronic controller for controlling a trolley pole switch as recited in claim 5 wherein said straight signal demodulation means includes:

(a) a third phase lock loop circuit for receiving said conditioned modulated straight signal from said first signal shaping circuit and said validation signal from said first level comparator circuit such that if said conditioned modulated straight signal and said validation signal are received simultaneously, said third phase lock loop circuit demodulates said conditioned modulated straight signal and generates in response thereto a square wave straight signal whose voltage level is representative of the frequency of a modulation straight signal carried by said conditioned modulated straight signal;

(b) a third low pass filter circuit for filtering noise from said square wave straight signal such that frequencies above a first preselected frequency corresponding to such modulation straight signal are substantially attenuated and frequencies below said first preselected frequency are allowed to pass therethrough;

(c) a third signal shaping circuit, through which said square wave turn signal passes from said third low pass filter circuit, for improving condition of the waveform of said square wave turn signal for further processing by said straight signal demodulation means; and (d) a third level comparator circuit for setting a lower voltage threshold and for comparing said voltage level of said square wave turn signal such that if said voltage level of said square wave turn signal lies above said lower voltage threshold said third level comparator circuit generates said low logic signal.

7. The electronic controller for controlling a trolley pole switch as recited in claim 6 wherein said output means includes:

(a) an input logic circuit for receiving said low logic signal from said second level comparator circuit and said low logic signal from said third level comparator circuit and for generating in response to either a high logic signal;

(b) a pulse generator circuit for receiving said high logic signal from said input logic circuit and for generating in response thereto a high pulse of adjustable duration;

(c) a turn logic circuit connected to said pulse generator circuit and said second level comparator circuit such that said turn logic circuit activates upon receiving both said pulse and said low logic signal thereby generating in response thereto a positive going pulse;

(d) a straight logic circuit connected to said pulse generator circuit and said third level comparator circuit such that said straight logic circuit activates upon receiving both said pulse and said low logic signal thereby generating in response thereto a positive going pulse;

(e) a turn driver circuit connected to said turn logic circuit such that said turn driver circuit energizes upon receiving said positive going pulse from said turn logic circuit thereby generating in response thereto a negative going pulse constituting said intermediate turn command signal; and (f) a straight driver circuit connected to said straight logic circuit such that said straight driver circuit energizes upon receiving said positive going pulse from said straight logic circuit thereby generating in response thereto a negative going pulse constituting said intermediate straight command signal.

8. The electronic controller for controlling a trolley pole switch as recited in claim 7 wherein said turn logic circuit and said straight logic circuit are configured to form a lock out circuit through which activation of one of said logic circuits automatically disables the other of said logic circuits thereby preventing both of said driver circuits from being simultaneously energized so as to prevent both of said intermediate command signals from being generated simultaneously.

9. The electronic controller for controlling a trolley pole switch as recited in claim 1 wherein said power controlling means includes a power reducing and regulating means for reducing and regulating power received from any one of such power conduits so as to supply said signal processing means with a source of regulated power to operate said signal processing means.

10. The electronic controller for controlling a trolley pole switch as recited in claim 9 wherein said signal processing means includes a voltage conversion means for receiving and regulating power received from said power controlling means for operation of said signal processing means.

11. An electronic controller for controlling a trolley pole switch, such trolley pole switch for switching the path of travel therethrough of an energy collector assembly of a trolley pole at a junction of power conduits diverging from such trolley pole switch, said electronic trolley pole switch controller comprising:

(a) a signal processing means for receiving and processing a plurality of modulated signals each of which indicative of a request to switch the path of travel of such energy collector assembly through such trolley pole switch to a desired one of such power conduits diverging therefrom and for generating in response to each of such modulated signals an intermediate command signal indicative of a command to supply power to an electrical operator of such trolley pole switch for effecting the switch in the path of travel therethrough to such desired one of such power conduits; and (b) a power controlling means for receiving said intermediate command signal from said signal processing means and for supplying in response thereto power to such electrical operator thereby energizing such electrical operator and therethrough compel certain elements of such trolley pole switch to switch the path of travel that such energy collector assembly will take through such trolley pole switch to such desired one of such power conduits.

12. The electronic controller for controlling a trolley pole switch as recited in claim 11 wherein said signal processing means includes a time out circuit such that for each such modulated signal received, said signal processing means generates said intermediate command signal for an adjustable duration.

13. The electronic controller for controlling a trolley pole switch as recited in claim 1 wherein said power controlling means includes:

(a) a first reduction means for reducing and regulating power received from any one of such power conduits to an initial power level;

(b) a chopper control means for outputting a first pair of alternating logic signals and a second pair of alternating logic signals, (c) a second reduction means controlled by said chopper control means such that when said second reduction means receives said first pair of alternating logic signals from said chopper control means, said second reduction means reduces said initial power level received from said first reduction means to a secondary power level usable by said signal processing means for operation of said signal processing means;

(d) a third reduction means for receiving said secondary power level from said second reduction means and said initial power level from said first reduction means such that said third reduction means reduces said secondary power level to a primary power level usable by said power controlling means to operate same as long as said initial power level is received from said first reduction means;

(e) a turn output means for receiving said second pair of alternating logic signals from said chopper control means and said initial power level from said first reduction means such that when said intermediate turn command signal is also received from said signal processing means, said turn output means switches power in response thereto from any one of such power conduits to such one electrical operator thereby switching the path of travel that such energy collector assembly will take through such at least one frog to such turn power conduit; and (f) a straight output means for receiving said second pair of alternating logic signals from said chopper control means and said initial power level from said first reduction means such that when said intermediate straight command signal is also received from said signal processing means, said straight output means switches power in response thereto from any one of such power conduits to such another electrical operator thereby switching the path of travel that such energy collector assembly will take through such at least one frog to such straight power conduit.

14. The power controlling means as recited in claim 13 wherein said first reduction means includes surge protection circuitry.

15. The power controlling means as recited in claim 13 wherein said second reduction means includes transient protection circuitry.

16. The power controlling means as recited in claim 13 wherein said turn output means includes surge protection circuitry.

17. The power controlling means as recited in claim 13 wherein said straight output means includes surge protection circuitry.

18. The power controlling means as recited in claim 13 wherein said turn output means includes:

(a) a turn input circuit for receiving at an input thereof said intermediate turn command signal from said signal processing means and for protecting said turn output means from excessive variations in power level that may appear at said input;

(b) a turn chopper circuit, controlled by said second pair of alternating logic signals received from said chopper control means, for outputting a third pair of alternating logic signals in response to said intermediate turn command signal received from said turn input circuit;

(c) a step down transformer circuit, controlled by said turn chopper circuit, whose primary winding has one outer lead receiving one of said third pair of alternating logic signals and another outer lead receiving another of said third pair of alternating logic signals and a center tap receiving said initial power level and whose secondary winding has both outer leads conveying a turn control voltage and a center tap conveying a turn out voltage such that when said intermediate turn command signal is received by said turn input circuit, said turn control voltage is a predetermined amount greater than said turn out voltage;

(d) a turn output control circuit for sensing said turn control voltage and said turn out voltage and for outputting a turn control signal when said turn control voltage is said predetermined amount higher than said turn out voltage and for outputting a turn out signal otherwise; and (e) a turn solenoid driver circuit, controlled by said turn output control circuit, such that when said turn control signal is received from said turn output control circuit, said turn solenoid driver circuit switches power from any one of such power conduits to such one electrical operator thereby switching the path of travel that such energy collector assembly will take through such at least one frog to such turn power conduit.

19. The power controlling means as recited in claim 18 wherein said turn solenoid driver circuit includes surge protection circuitry.

20. The power controlling means as recited in claim 13 wherein said straight output means includes:

(a) a straight input circuit for receiving at an input thereof said intermediate straight command signal from said signal processing means and for protecting said straight output means from excessive variations in power level that may appear at said input;

(b) a straight chopper circuit, controlled by said second pair of alternating logic signals received from said chopper control means, for outputting a fourth pair of alternating logic signals in response to said intermediate straight command signal received from said straight input circuit;

(c) a step down transformer circuit, controlled by said straight chopper circuit, whose primary winding has one outer lead receiving one of said fourth pair of alternating logic signals and another outer lead receiving another of said fourth pair of alternating logic signals and a center tap receiving said initial power level and whose secondary winding has both outer leads conveying a straight control voltage and a center tap conveying a straight out voltage such that when said intermediate straight command signal is received by said straight input circuit, said straight control voltage is a predetermined amount greater than said straight out voltage;

(d) a straight output control circuit for sensing said straight control voltage and said straight out voltage and for outputting a straight control signal when said straight control voltage is said predetermined amount higher than said straight out voltage and for outputting a straight out signal otherwise; and (e) a straight solenoid driver circuit, controlled by said straight output control circuit, such that when said straight control signal is received from said straight output control circuit, said straight solenoid driver circuit switches power from any one of such power conduits to such another electrical operator thereby switching the path of travel that such energy collector assembly will take through such at least one frog to such straight power conduit.

21. The power controlling means as recited in claim 20 wherein said straight solenoid driver circuit includes surge protection circuitry.

22. The power controlling means as recited in claim 13 wherein said chopper control means includes a shut down circuit that disables said chopper control means when said first reduction means ceases supplying said initial power level to said shut down circuit.

* * * * *